US010876366B2

(12) United States Patent
Hau et al.

(10) Patent No.: US 10,876,366 B2
(45) Date of Patent: Dec. 29, 2020

(54) CORE SAW AND SUPPORT FRAME STRUCTURE

(71) Applicant: McLaughlin Group, Inc., Greenville, SC (US)

(72) Inventors: Paul W. Hau, Watertown, WI (US); James T. Dungan, Woodruff, SC (US)

(73) Assignee: McLaughlin Group, Inc., Greenville, SC (US)

( * ) Notice: Subject to any disclaimer, the term of this patent is extended or adjusted under 35 U.S.C. 154(b) by 0 days.

(21) Appl. No.: 15/709,390

(22) Filed: Sep. 19, 2017

(65) Prior Publication Data

US 2018/0087338 A1    Mar. 29, 2018

Related U.S. Application Data

(60) Provisional application No. 62/399,978, filed on Sep. 26, 2016.

(51) Int. Cl.
| E21B 25/00 | (2006.01) |
| F16C 19/36 | (2006.01) |
| E21B 7/02 | (2006.01) |
| E21B 10/02 | (2006.01) |
| E21B 25/10 | (2006.01) |

(52) U.S. Cl.
CPC .............. *E21B 25/00* (2013.01); *E21B 7/027* (2013.01); *E21B 10/02* (2013.01); *E21B 25/10* (2013.01); *F16C 19/36* (2013.01)

(58) Field of Classification Search
CPC ........ B28D 1/045; B28D 1/041; B28D 1/044; B28D 1/14; E01C 23/094; E21B 7/02; E21B 7/024; E21B 7/027; E21B 10/02
See application file for complete search history.

(56) References Cited

U.S. PATENT DOCUMENTS

| 3,507,338 | A | 4/1970 | McWaters et al. |
| 5,558,169 | A | 9/1996 | Madgwick et al. |
| 6,896,072 | B2 * | 5/2005 | MacDonald ............ E21B 7/024 173/189 |
| 8,327,950 | B2 * | 12/2012 | Pollock .................... E21B 7/028 173/185 |
| 10,279,508 | B1 * | 5/2019 | Thornton ................ B28D 1/041 |
| 2009/0044983 | A1 * | 2/2009 | Gobright, IV ........ B23D 59/006 175/203 |
| 2011/0174545 | A1 | 7/2011 | Hartke et al. |
| 2017/0356262 | A1 * | 12/2017 | Froemming ............ E21B 7/027 |

OTHER PUBLICATIONS

CS418—Core Saw—Truck Mounted Operator's and Maintenance Manual; introduction and pp. 20-1 through 20-7, 30-3, and 50-6 through 50-7.
CS418—Core Saw—Trailer Operator's and Maintenance Manual; introduction and pp. 15-1, 20-1 through 20-9, 40-5, 45-4 through 45-6, and 85-4.

* cited by examiner

*Primary Examiner* — Kipp C Wallace
(74) *Attorney, Agent, or Firm* — Nelson Mullins Riley & Scarborough LLP

(57) ABSTRACT

A wheeled vehicle and core saw system has a chassis, a first sub-frame, a core saw attached to the first sub-frame, and a second sub-frame attached to the chassis frame and attached to the first sub-frame. A selectively engageable bearing may be disposed between the second sub-frame and the chassis frame that facilitates movement between the second sub-frame and the chassis frame. The second sub-frame may be moveable with respect to the chassis frame and a water tank.

24 Claims, 14 Drawing Sheets

CORE SAW AND SUPPORT FRAME STRUCTURE

The present application claims the benefit of the filing date of U.S. provisional Patent Application No. 62/399,978, filed Sep. 26, 2016, the entire disclosure of which is hereby incorporated by reference herein for all purposes.

BACKGROUND OF THE INVENTION

A core saw utilizes a saw blade in a ring shape that is rotated by a motor above the blade and pushed downward to cut straight down into an earthen, concrete, or other work surface, thereby separating a core from the larger work surface without destroying the core. In some instances, for example where core saws are used to remove cores from an earth or building surface, this allows a core to be removed, to thereby allow work to be performed within or beneath the surface, and the core then replaced back into the hole and resurfaced. Water is often directed to the cutting surface while the core saw blade is in use, to remove heat from the blade and suppress dust.

Core saws are made in various sizes, depending on the uses for which they are intended. Saws used to cut earthen cores can be large, so that they are carried on the beds of motorized vehicles or wheeled trailers. Such vehicles also carry the water tank, pumps, and motors needed in the use of these devices.

SUMMARY OF THE INVENTION

In an embodiment of the present invention, a wheeled vehicle and core saw system has a chassis having a frame and a plurality of wheels attached to the chassis frame so that the chassis frame is movable on the wheels in forward and rearward directions with respect to the chassis frame, a first sub-frame, and a core saw attached to the first sub-frame. The core saw has a motor with an output shaft and a core bit attached to the output shaft. A second sub-frame is attached to the chassis frame and is attached to the first sub-frame so that the first sub-frame is movable vertically with respect to the second sub-frame. At least part of the second sub-frame, to which the first sub-frame is attached, is movable with respect to the chassis frame substantially in the forward and rearward directions and substantially in side directions perpendicular to the forward and rearward directions. A mechanical actuator is operably attached between the first sub-frame and the second sub-frame so that actuation of the mechanical actuator moves the first sub-frame vertically with respect to the second sub-frame. A selectively engageable bearing is disposed at a position between the second sub-frame and the chassis frame at which, at a first vertical position of the first sub-frame with respect to the second sub-frame, the second sub-frame supports a portion of the weight of the core saw that brings the second sub-frame into engagement with the chassis frame through the bearing, and at a second vertical position of the first sub-frame with respect to the second sub-frame, at which a surface independent of the second sub-frame bears at least part of the weight of the core saw, the second sub-frame disengages from the chassis frame via the bearing. The bearing facilitates movement between the second sub-frame and the chassis frame in at least one of substantially the forward and rearward directions and substantially the side directions.

In a further embodiment, a wheeled vehicle and core saw system has a chassis having a frame and a plurality of wheels attached to the chassis frame so that the chassis frame is movable on the wheels in forward and rearward directions with respect to the chassis frame, a first sub-frame, and a core saw attached to the first sub-frame. The core saw has a motor with an output shaft and a core bit attached to the output shaft. A second sub-frame is attached to the chassis frame and is attached to the first sub-frame so that the first sub-frame is movable vertically with respect to the second sub-frame. At least part of the second sub-frame, to which the first sub-frame is attached, is movable with respect to the chassis frame substantially in the forward and rearward directions and substantially in side directions perpendicular to the forward and rearward directions. A mechanical actuator is operably attached between the first sub-frame and the second sub-frame so that actuation of the mechanical actuator moves the first sub-frame vertically with respect to the second sub-frame. A selectively engageable lock has a first surface attached to the second sub-frame and a second surface attached to the chassis frame. The first surface and the second surface are disposed with respect to each other so that when the first surface and the second surface are engaged, the lock inhibits relative movement between the second sub-frame and the chassis frame in at least one of substantially the forward and rearward directions, and substantially the side directions. The lock is disposed at a position between the second sub-frame and the chassis frame at which at a first vertical position of the first sub-frame with respect to the second sub-frame, the second sub-frame supports a portion of the weight of the core saw that separates the first surface and the second surface, and at a second vertical position of the first sub-frame with respect to the second sub-frame, at which a surface independent of the second sub-frame bears at least part of the weight of the core saw, the first and surface and the second surface are engaged.

In a still further embodiment, a wheeled vehicle and core saw system has a chassis having a frame and a plurality of wheels attached to the chassis frame so that the chassis frame is movable on the wheels in forward and rearward directions with respect to the chassis frame, a first sub-frame, and a core saw attached to the first sub-frame. The core saw has a motor with an output shaft and a core bit attached to the output shaft. A tank defines an internal volume for storage of water. A nozzle is disposed proximate the core bit so that water expelled through the nozzle under pressure is directed toward the core bit. A water conduit extends between the tank and the nozzle. The conduit includes a pump configured to pump water under pressure from the tank to the nozzle. A second sub-frame is attached to the chassis frame and is attached to the first sub-frame so that the first sub-frame is movable vertically with respect to the second sub-frame. At least part of the second sub-frame, to which the first sub-frame is attached, is movable with respect to the chassis frame and the tank substantially in the forward and rearward directions and substantially in side directions perpendicular to the forward and rearward directions. A mechanical actuator is operably attached between the first sub-frame and the second sub-frame so that actuation of the mechanical actuator moves the first sub-frame vertically with respect to the second sub-frame.

The accompanying drawings, which are incorporated in and constitute a part of this specification, illustrate one or more embodiments of the present invention.

BRIEF DESCRIPTION OF DRAWINGS

Aspects of the present invention can be better understood with reference to the following drawings. The components in the drawings are not necessarily to scale. An enabling disclosure of the present invention, including the best mode thereof, is set forth in the specification, which makes reference to the appended drawings, in which.

Figure 1:
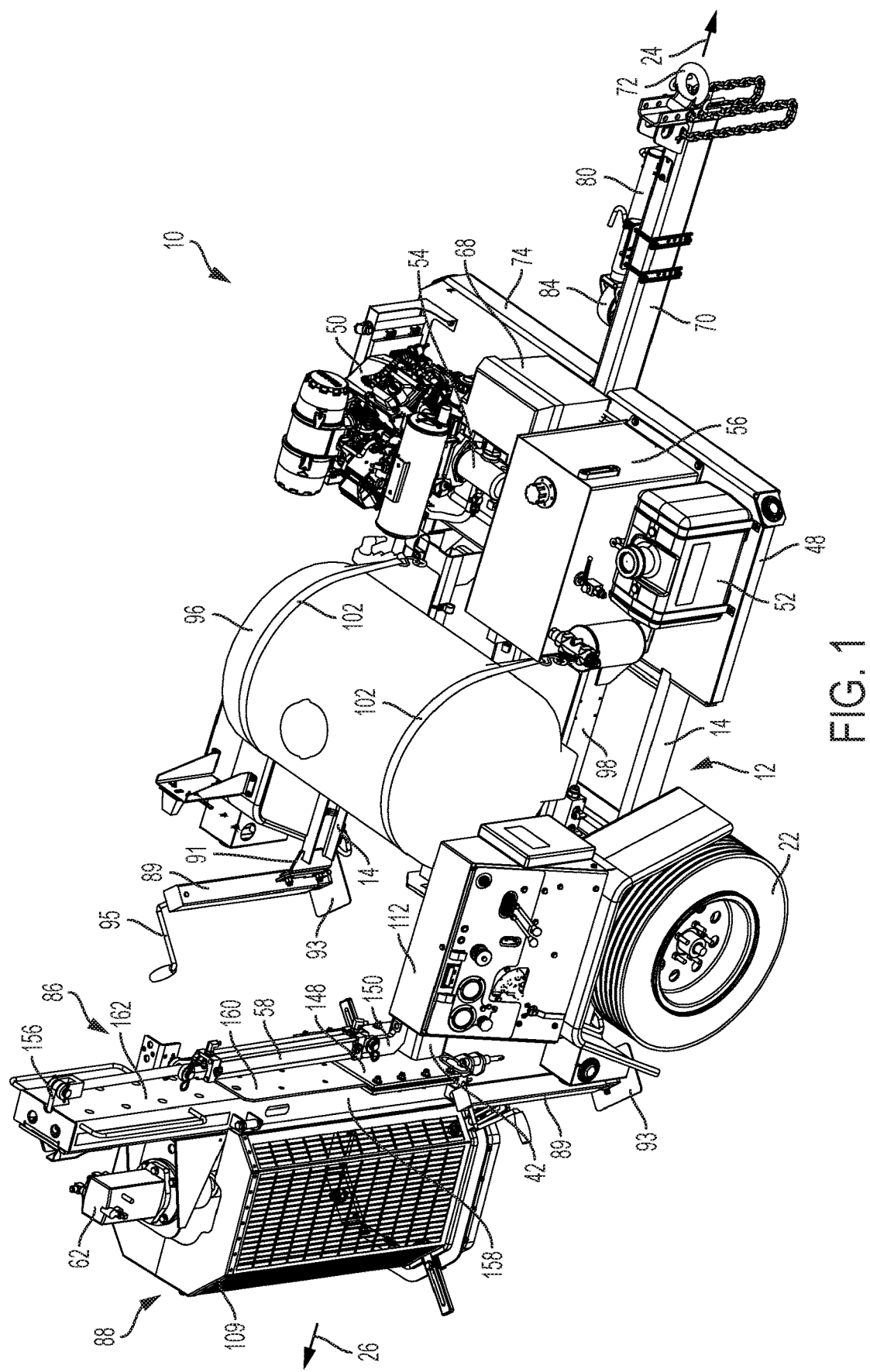
FIG. 1 is a perspective view of a wheeled vehicle and core saw system according to an embodiment of the present invention, in the form of a non-motorized trailer.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in such examples without departing from the scope or spirit thereof. For instance, features illustrated or described as part of one of embodiment may be used on another embodiment to yield a still further embodiment. Thus, it is intended that the present invention covers such modifications and variations as come within the scope of the appended claims and their equivalents.

As used herein, terms referring to a direction, or a position relative to the orientation of the core saw, such as but limited to "vertical," "horizontal," "upper," "lower," "above," "below," "forward," "rearward," "lateral," or "side," refer to directions and relative positions with respect to the core saw's orientation in its normal intended operation, as indicated in FIGS. 1 through 7 herein. Thus, for instance, the terms "vertical" and "upper" refer to the vertical orientation and the relative upper position in the perspective of FIG. 1. The term "forward" should be understood to be in the direction of the forward trailer hitch, while "rearward" should be understood to be in the direction, also along the frame of the trailer, toward the core saw cage. Such directions are not limited by these structures and may extend beyond them. Thus, such directions and words of orientation should be understood in this context, even with respect to core saws that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout specification and claims, the following terms take at least the meanings explicitly associated herein, unless the context dictates otherwise. The meanings identified below do not necessarily limit the terms, but merely provided illustrative examples for the terms. The meaning of "a" and "an" and "the" may include plural references, and the meaning of "in" may include "in" and "on." The phrase "in one embodiment," as used herein does not necessarily refer to the same embodiment, although it may.

Figure 2:
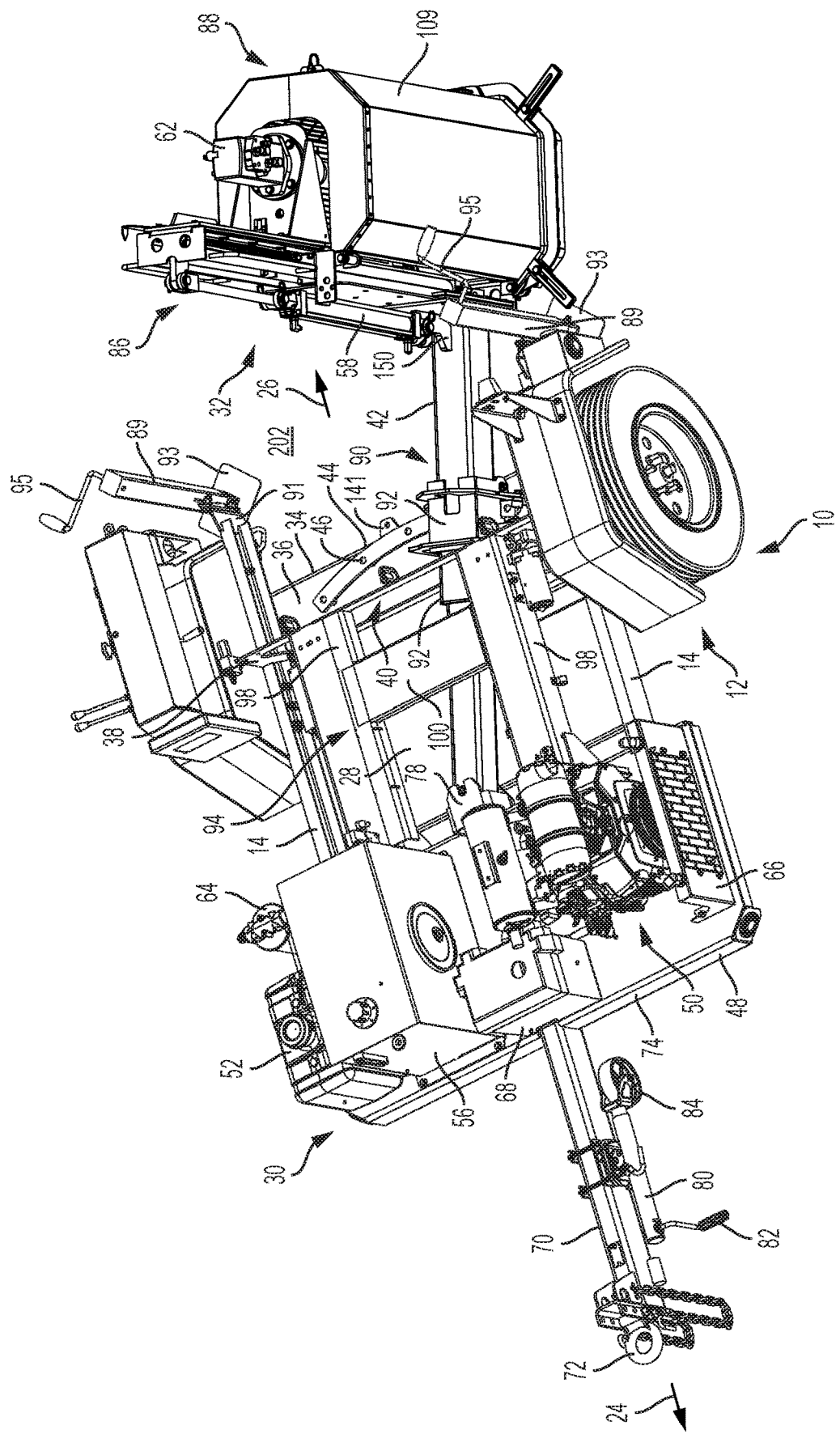
FIG. 2 is a partial perspective view of the wheeled vehicle and core saw system of FIG. 1.

Referring to FIGS. 1-7, a wheeled vehicle and core saw system 10 is in the form of a trailer that includes a chassis frame 12. As more particularly illustrated in FIGS. 3, 5 and 6, frame 12 include a pair of opposing, parallel side rails 14 that form opposing side boundaries of frame 12. A wheeled axle 16 extends laterally between side rails 14 and is attached to the side rails by a pair of brackets 18. A pair of spindles 20 extend from respective legs that extend from the main portion of axle 16. Hubs rotatably secured on the spindles, in turn, support respective wheels 22. The wheels are secured to the frame so that the trailer is movable on the wheels in a forward direction 24 and a rearward direction 26. A generally planar bottom pan 28 attaches to the bottom of side rails 14 and extends laterally across the trailer, forming a bottom surface of the trailer. As indicated below, trailer 10 includes hydraulic hoses that extend from the trailer's front area 30 to its rear area 32 (FIG. 2). The hoses extend above pan 28, so that the pan serves to retain the lines and protect the lines from contacting the ground surface or becoming caught on debris or other objects beneath the trailer as the trailer moves, thereby protecting the lines from damage.

At the rear of frame 12 is a cross member 34 having an L-shaped cross-section in a vertical plane that bisects the cross member. Cross member 34 includes a generally planar (in a generally horizontal plane) portion 36 and a generally planar vertical portion 38 extending upward from the forward edge of planar portion 36. Vertical portion 38 defines a laterally-extending slot 40 to allow passage of an elongated sub-frame member 42 (FIGS. 2 and 8) therethrough. A running rail, or race, 44 (FIGS. 2, 3, and 7) is attached to planar portion 36 of cross member 34 by five vertically extending pins 46 that offset the race above surface 36, as described in more detail below.

At the trailer's forward end, a cross member 48 is also secured to and extends between side rails 14. Cross member 48 is wider in directions 24/26 than is horizontal portion 36 of rear cross member 34, so that cross member 48 may serve as an equipment platform, supporting a gasoline engine 50 that draws gasoline from a fuel tank 52 via fuel lines (not shown), and a hydraulic pump 54 that is driven by motor 50 and that pumps hydraulic fluid from a hydraulic fluid reservoir 56 to hydraulic pistons 58 and 60 (FIG. 4) and a hydraulic motor 62 that rotationally drives the core saw spindle and blade, via hydraulic lines (not shown) that extend from pump 54 to the hydraulic pistons and motor. A filter 64 filters the hydraulic fluid. A hydraulic oil filter 66 cools hydraulic fluid returning from the pistons and the hydraulic motor before the fluid returns to hydraulic reservoir 56. A battery box 68 encloses a battery that powers a starter motor (not shown) in the assembly of gasoline engine 50.

Attached to cross member 48, and also forming a part of chassis frame 12, is an elongated forward arm 70 that is aligned (in its elongated direction) in forward and rearward directions 24/26. A hitch 72 is bolted to the forward end of arm 70 and is connectible to a tow hitch of a motor vehicle for towing trailer 10, as should be understood. Arm 70 extends through downwardly-extending flanges 74 and 76 of cross member 48 and is welded thereto. A bracket 78 is welded to the rearward end of forward arm 70, and supporting leg 80 is pivotally attached to arm 70 at its forward end. As should be understood, arm 80 may be pivoted to a vertical position from the horizontal position shown in the figures. Arm 80 is comprised of two telescoping portions that can be extended from each other by operation of a hand crank 82 so that, when deployed, arm 80 provides vertical support to frame 12 at its forward end from a ground surface engaged by a wheel 84.

A pair of jacks 89 are attached to side rails 14 by a pair of flanges 91 welded to respective side rails 14. Each jack is comprised of an elongated telescoping main member, the bottom telescoping section of which is attached to a bottom platform 93. The elongated members of jacks 89 are aligned (in their elongated and telescoping direction) generally vertically. When an operator reaches a work site, the operator actuates respective handles 95 to push the inner telescoping member of the jack downward, until bottom plate 93 engages the ground surface. The jack may be locked into position at this point, as should be understood in view of the present disclosure, to thereby secure trailer 10 in a position with respect to a ground, floor, or other supporting surface engaged by the jacks. In another embodiment, in which wheeled chassis 12 is the chassis of a motorized vehicle such as a truck, jacks 89 may be omitted, as the chassis's position may be secured by securing the position of the motorized vehicle, for example by engaging the transmission of the inactive vehicle and/or engaging an emergency brake.

Accordingly, chassis frame 12 is comprised of forward arm 70, side rails 14, and cross members 34 and 48. Pan 28 does not bear a material portion of the load supported by chassis frame 12 but may be considered part of chassis frame 12. These components may be made of steel or other suitable materials and, along with arm 80, axle 16, spindles 20 and their hubs, wheels 22, and the sub-frames (described below), form the trailer. As described above, a motor vehicle chassis may be utilized instead of the trailer chassis illustrated in the present Figures.

Trailer 10, in the embodiment illustrated in the Figures, includes three sub-frames. A first sub-frame 86 supports a core saw 88 and attaches the core saw to a second sub-frame 90 (FIGS. 2 and 4) that, in turn, attach first sub-frame 86 and core saw 88 to chassis frame 12 via bracket 78 and a collar 92 (FIGS. 2, 4, 7, and 8), as discussed in more detail below. A third sub-frame 94 supports a water tank 96.

Third sub-frame 94 includes two parallel elongated rails 98 and a transverse cross member 100 welded or otherwise secured (e.g. by a slotted interface) to the sides of elongated rails 98. Rails 98 attach at their forward ends to chassis frame cross member 48 by brackets 102 and at their rear ends to vertical portion 38 of cross member 34 of the chassis frame, all by welding. Water tank 96 rests on the platform formed by rails 98 and cross member 100 and is held in place by a pair of tie straps 102 that attach to loop hitches 104 that are attached to rails 98.

Figure 7:
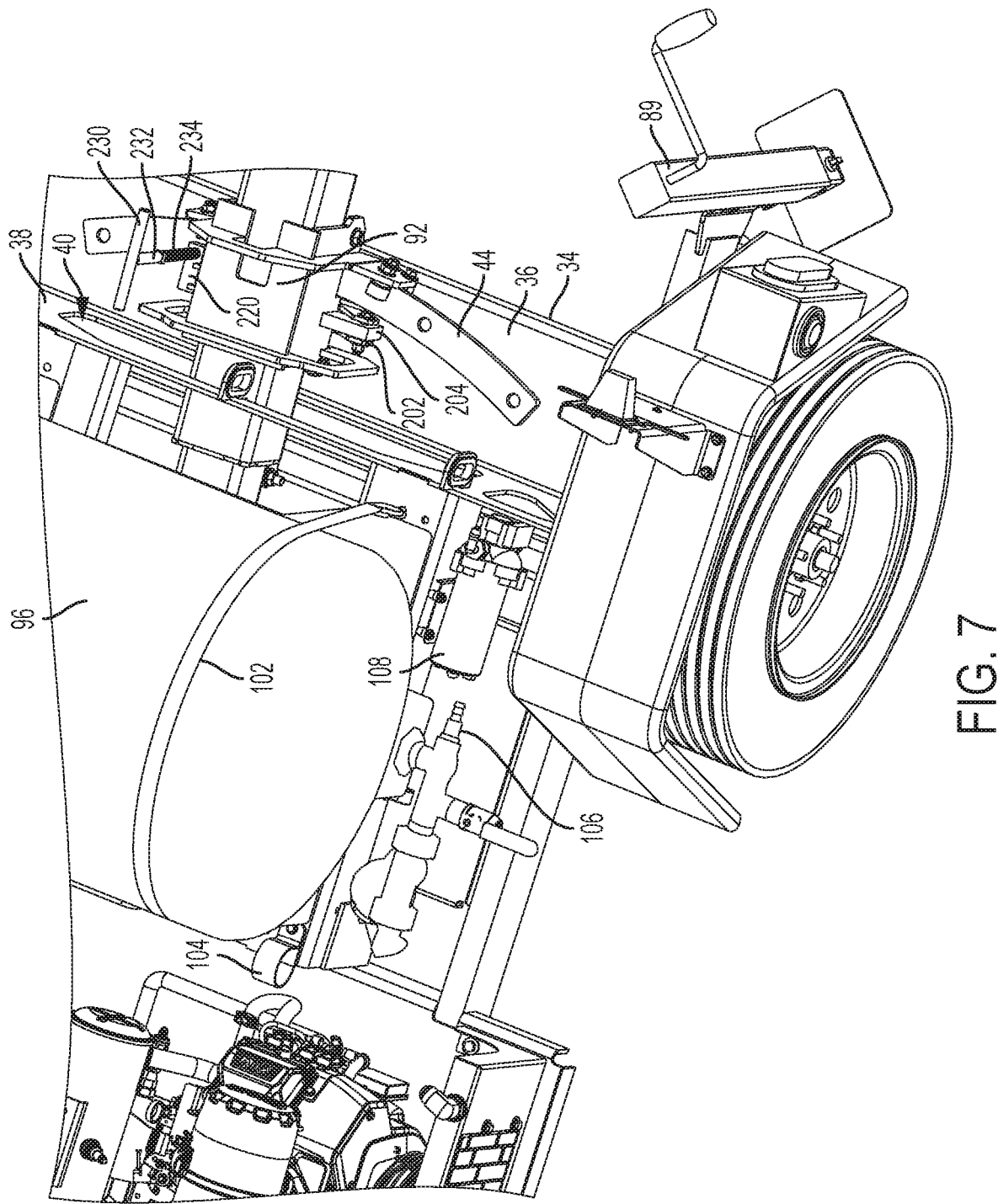
FIG. 7 is a partial perspective view of the wheeled vehicle and core saw system as in FIG. 1.
Figure 11:
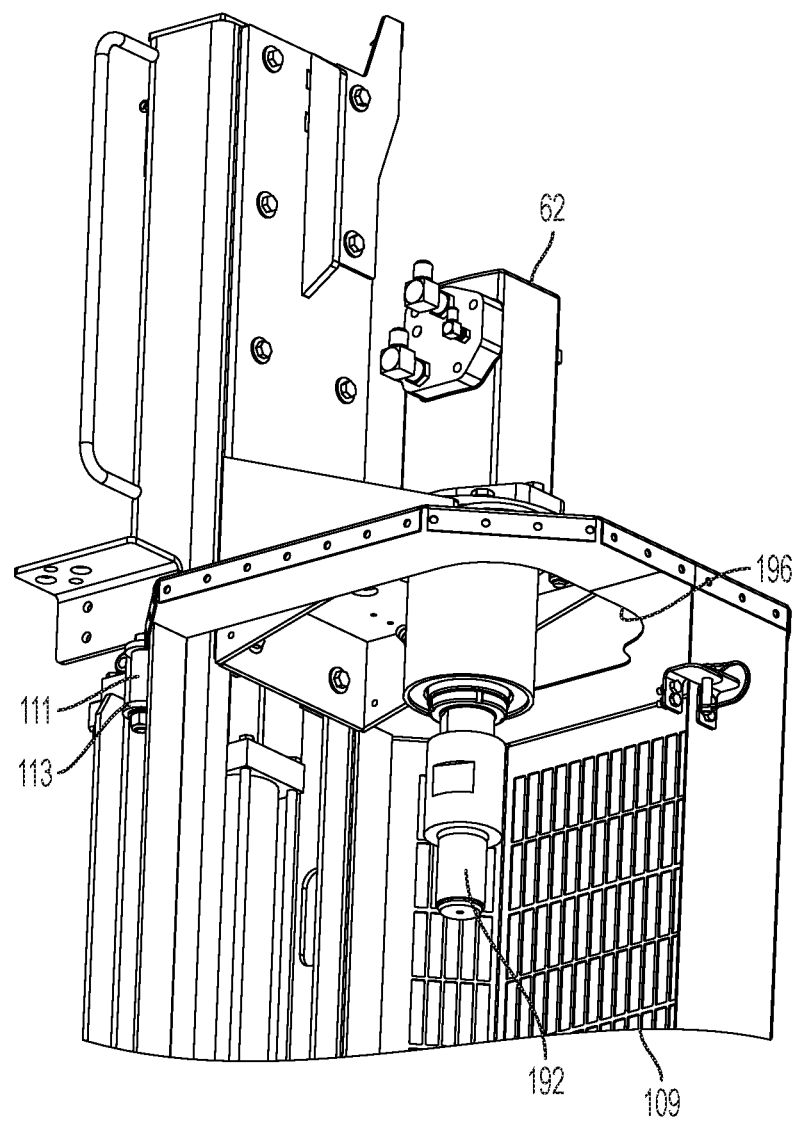
FIG. 11 is a partial perspective view of the wheeled vehicle and core saw system as in FIG. 1.
Figure 12:
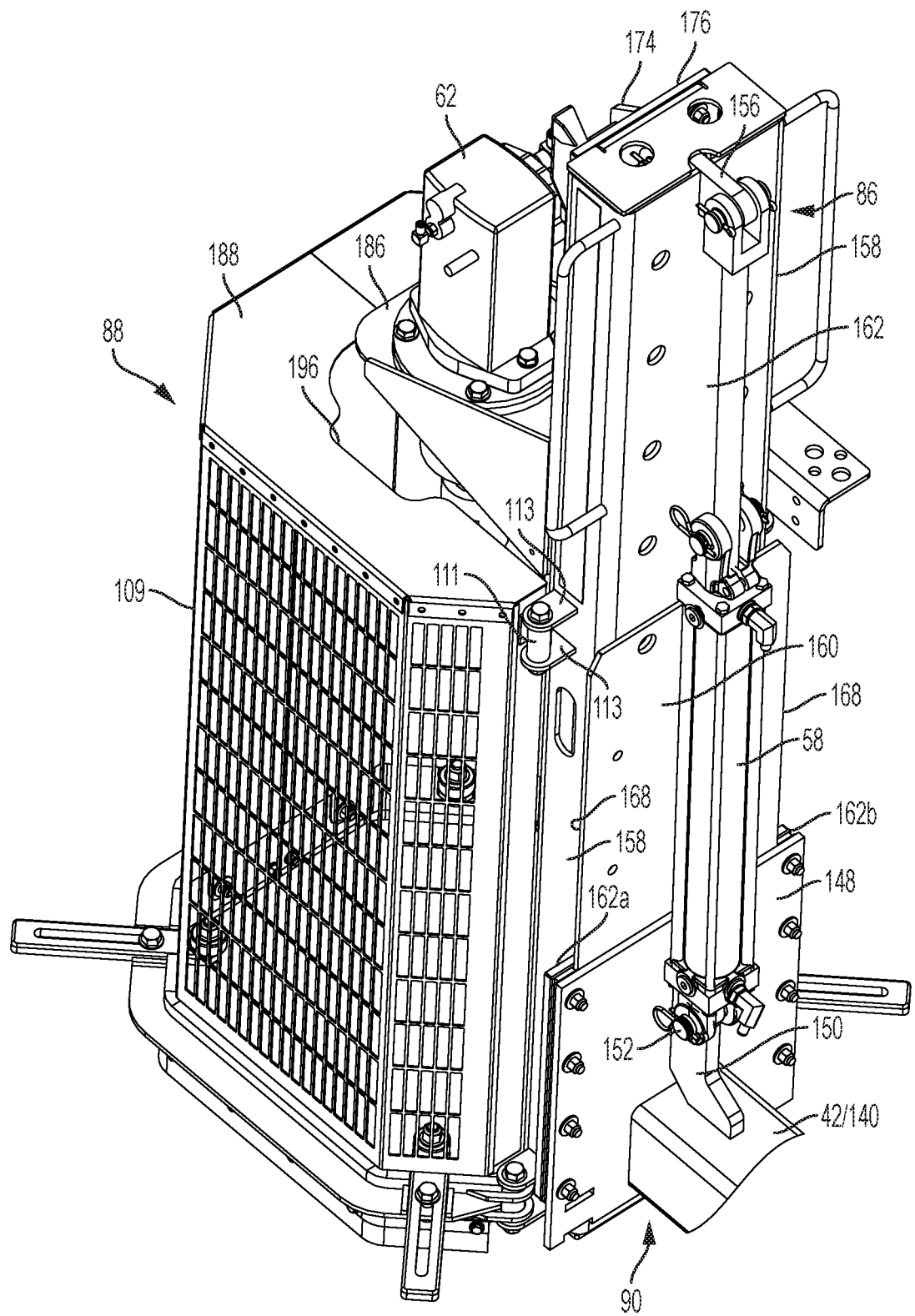
FIG. 12 is a partial perspective view of the wheeled vehicle and core saw system as in FIG. 1.
Figure 13:
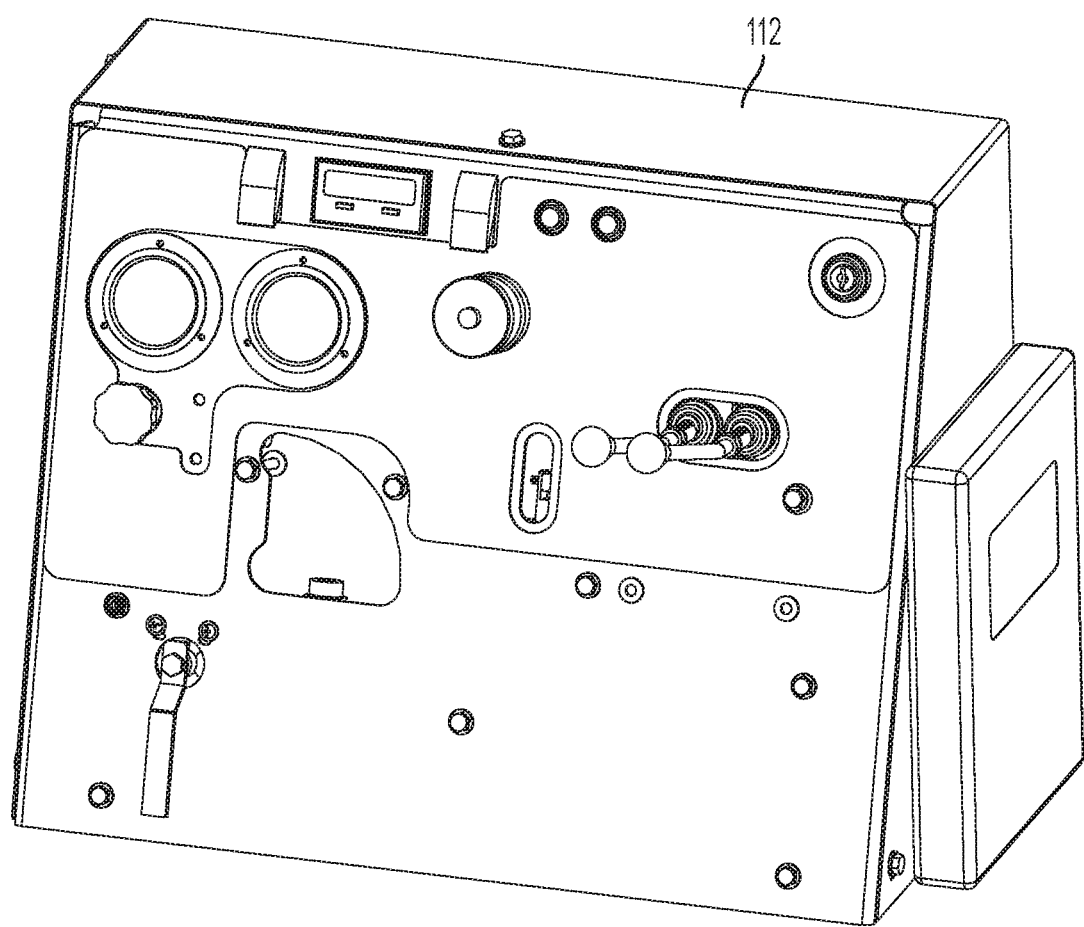
FIG. 13 is a partial perspective view of the wheeled vehicle and core saw system as in FIG. 1.

Referring also to FIG. 7, water tank 96 includes a water outlet fitting 106 in fluid communication with the tank's interior water storage volume so that water flows out of fitting 106 when the fitting is open. A water conduit line (not shown) extends from fitting 106 to an inlet fitting of a water pump 108. An outlet of pump 108 is connected to a water conduit line (not shown) that extends to an interior water line that, in turn, extends through drill shaft 192 (FIG. 11) of core saw 88 (FIGS. 1, 2, 4, 11, and 12) so that the water line directs pressurized water to the engagement of a core saw blade 110 (FIG. 4) as it makes a cut on a work piece, as should be understood. Water pump 108 is an electric pump, powered by the battery in box 68. Actuation of power from battery 68 to pump 108 is controlled manually through operator control at an operator controller and control interface 112 (FIGS. 1 and 13).

Figure 3:
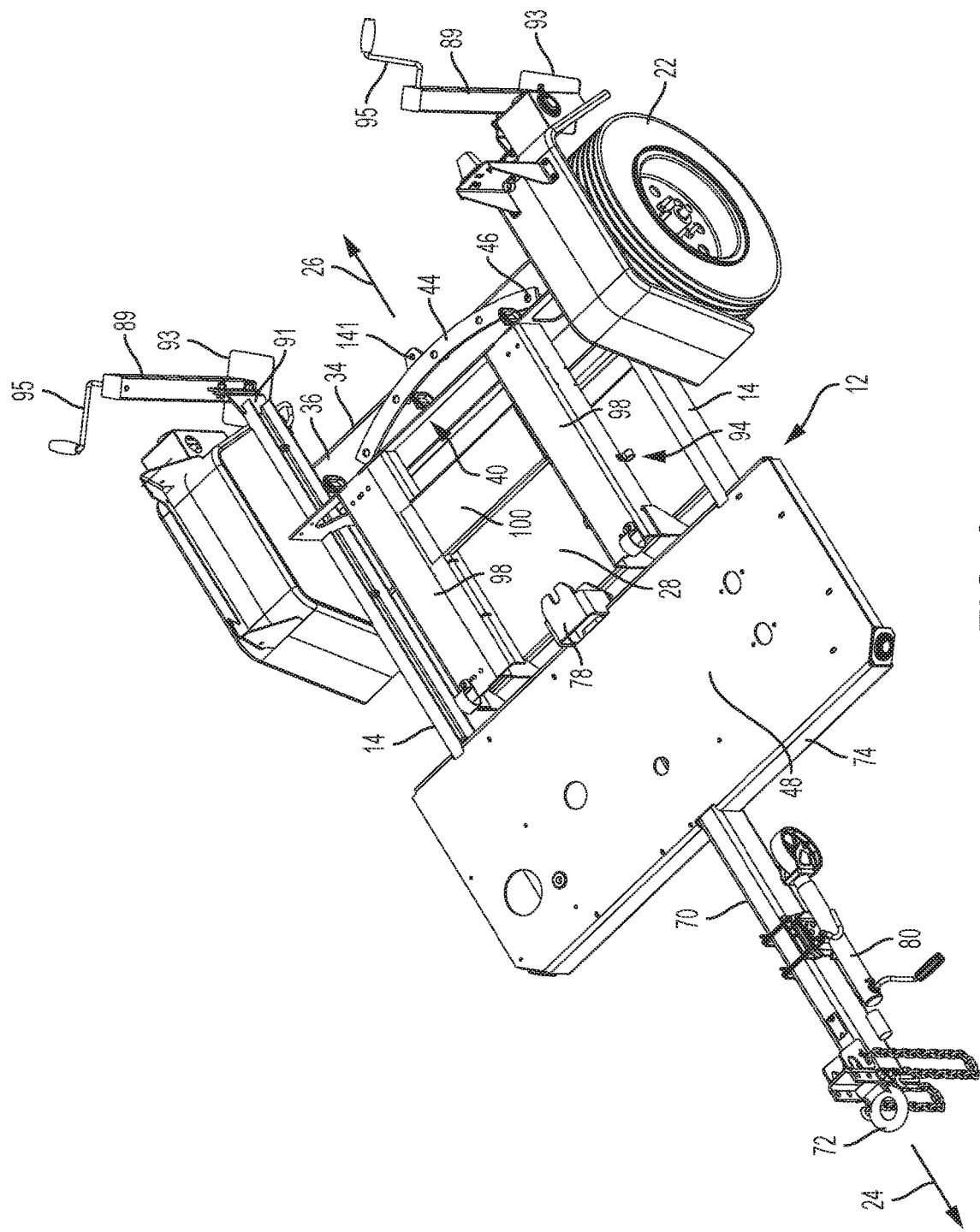
FIG. 3 is a partial perspective view of the wheeled vehicle and core saw system as in FIG. 1.
Figure 4:
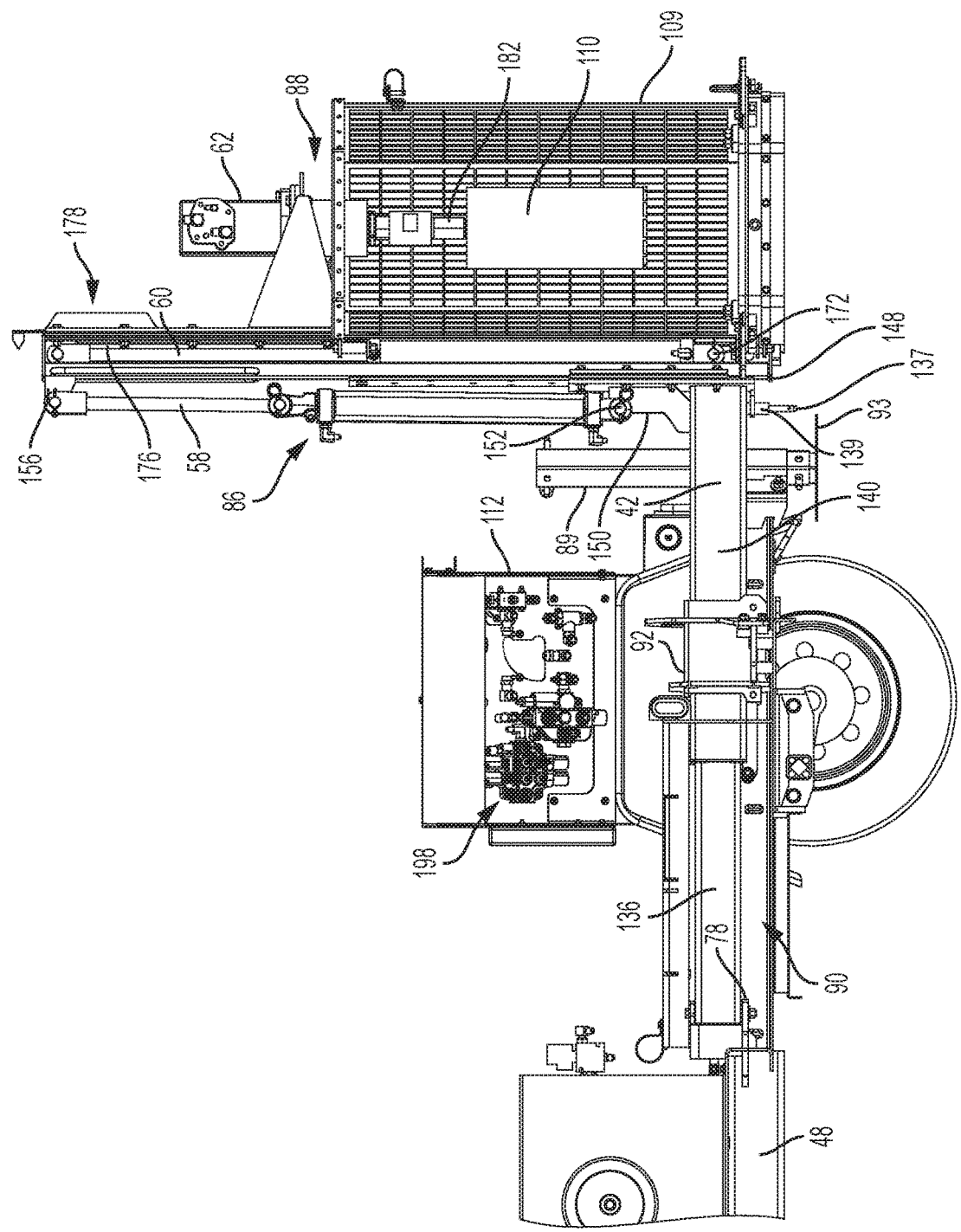
FIG. 4 is a partial side view of the wheeled vehicle and core saw system as in FIG. 1, with a core saw blade.
Figure 5:
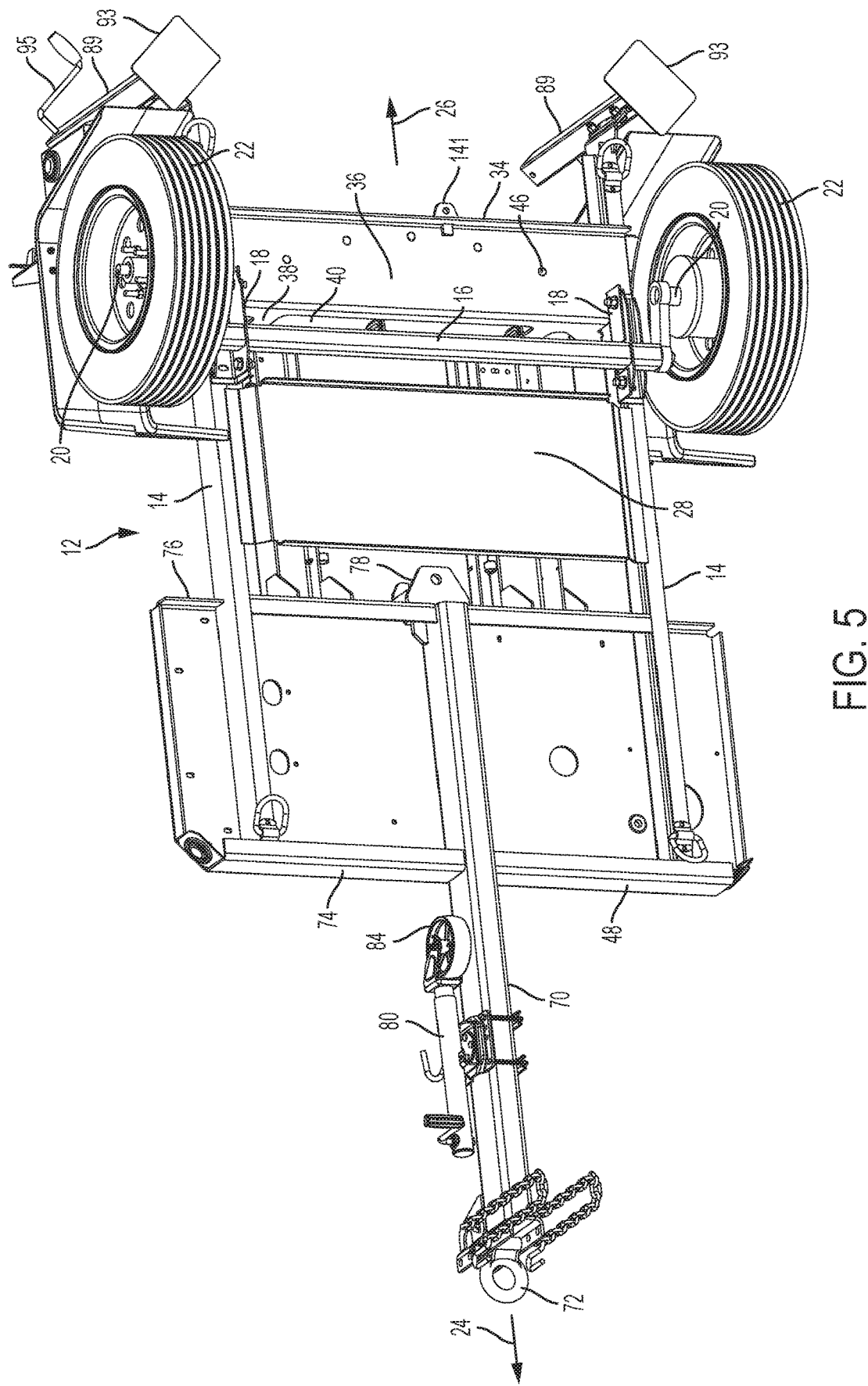
FIG. 5 is a partial perspective view of the wheeled vehicle and core saw system as in FIG. 1.
Figure 6:
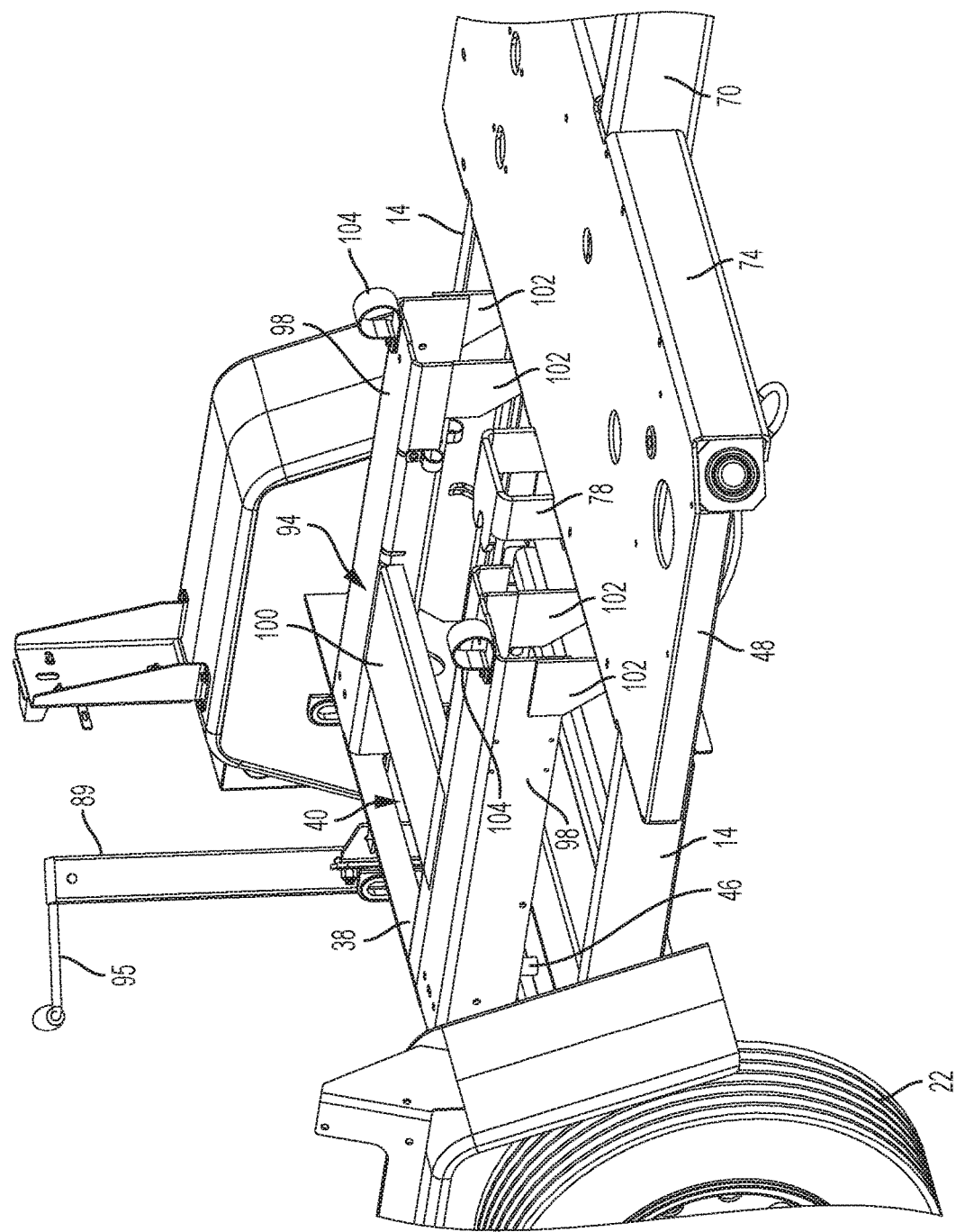
FIG. 6 is a partial perspective view of the wheeled vehicle and core saw system as in FIG. 1.
Figure 8:
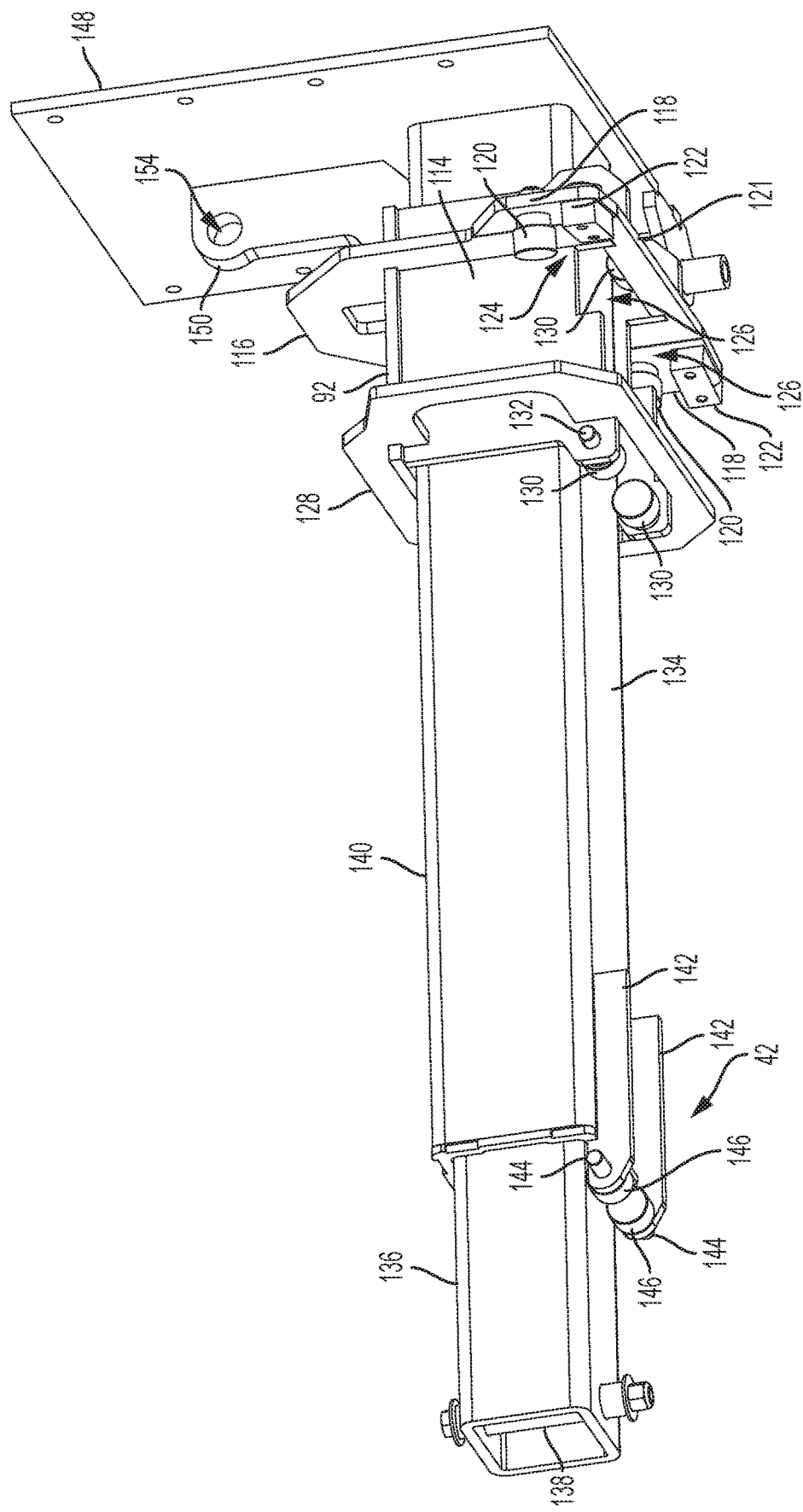
FIG. 8 is a perspective view of a sub-frame for use in the wheeled vehicle and core saw system as in FIG. 1.

Referring to FIGS. 2, 4, and 8, second sub-frame 90 includes elongated, telescoping, box beam element 42, pivotally attached to chassis frame 12 at bracket 78 (FIGS. 2, 3, 4, 5, and 6) and to which collar 92 is mounted. Collar 92 may be considered part of second sub-frame 90 or chassis frame 12, or both, depending on the particular function it performs, as discussed herein. Collar 92 has a C-shaped main body 114, the open side of which faces downward. At one end of body 114 is a vertically-oriented generally planar bracket 116, which may be welded to body 114. Bracket 116 is box-shaped, with two vertical legs that extend down on either side of body 114 and a bottom member 121 that extends across, under body 114. Two side bracket flanges 118 are attached to the side legs of bracket 116 and extend from the plane defined by the generally planar bracket (perpendicular to the longitudinal axis of elongated element 42) at a slight acute angle with respect to that plane. Each of flanges 118 has a pin that extends therethrough and to which is attached a respective running wheel 120. The two wheels 120 are spaced apart laterally (with respect to the longitudinal axis of elongated element 42). The lateral separation is such that both wheels 120 ride on race 44, and, moreover, the orientations of generally planar flanges 118 at an acute angle with respect to a transverse plane perpendicular to that longitudinal axis aligns the rotational axis of each of the wheels so that the axis is aligned radially with respect to the curve defined by race 44 (FIGS. 2, 3, and 7) so that the wheels run along the race's curve as collar 92 moves transversely with respect to the chassis frame.

Race 44 is disposed beneath wheels 120 and above two friction blocks 122. As described below, there is sufficient vertical distance between wheels or rollers 120 and friction blocks 122 in gaps 124 between the wheels and the friction blocks to accommodate the vertical width of race 44 yet also allow a limited vertical relative movement between collar 92 and race 44. Nonetheless, and accommodating the relative vertical movement, rollers 120 and friction blocks 122 locate the collar vertically with respect to the race. Furthermore, gaps 124 are aligned vertically with a pair of vertically-extending notches 126 at the bottom edges of the two vertical sides of body 114 of collar 92. Accordingly, race 44, as it extends through gaps 124 between the rollers and the friction blocks, simultaneously extends through notches 126 so that notches 126 locate collar 92 on race 44, preventing collar 92 from moving forward or backward away from race 44 during use of the trailer and elongated member 42, as discussed below. Accordingly, the interaction between race 44 and notches 126 guides collar 92 as it moves transversely with respect to chassis frame 12, so that the transversely-moving collar follows the race's curve and wheels 120 maintain contact with the race.

Because race 44 passes between rollers 120 and friction blocks 122, race 44 is elevated above the surface of horizontal portion 36 of cross member 34 by posts 46, as described below, thereby providing clearance for friction blocks 122 to extend between the race and horizontal portion 36 (FIG. 7). Posts 46 (FIGS. 2, 5 and 6) are mounted on the top of horizontal portion 36 and may be welded thereto or bolted to portion 36 from underneath. Posts 46 may be attached to the center of race 44 so that the back part of race 44 extends rearwardly into gaps 124 without causing friction blocks 122 to interfere with posts 46 as elongated member 42 and collar 92 traverse the race.

In addition to providing support for rollers 120 and friction blocks 122, bracket 116 serves to stiffen collar 92, inhibiting collar 92 from flexing during movement of elongated member 42 and, therefore, inhibiting binding between the collar and the elongated member. Similarly, a second bracket 128 surrounds the collar at its forward end, also providing stiffening support to the collar.

Four rollers 130 are attached by respective pins 132 to the sides of body 114 of collar 92 so that rollers 130 rotate about respective axes that are perpendicular to a longitudinal axis of elongated box beam member 42. Thus, when engaged with a bottom surface 134 of elongated member 42, rollers 130 facilitate relative movement between collar 92 and elongated member 42 in forward and rearward directions 24/26 (generally), along the elongated member's longitudinal axis.

As indicated in FIG. 8, a steel tube 136 forms an inner member of the telescoping elongated member 42 and is pivotally attached to the chassis frame at bracket 78 (FIGS. 2-6) that attaches to cross member 48 (FIG. 3). A vertically extending pin 138 extends through and is secured by opposing nuts and washers to beam portion 136 and bracket 78, thereby pivotally attaching elongated member/beam 42 to cross member 48 and, thereby, to the trailer chassis. Accordingly, if a forward-to-rearward centerline of the trailer is considered the trailer's longitudinal axis, beam 42 is pivotable in a horizontal plane that includes the trailer's longitudinal axis, about a vertical axis defined by an axis of pin 138 and perpendicular to the horizontal plane.

Forward beam portion 136 is a box beam that telescopes within a rearward, outer box beam 140 of elongated beam 42. Beam portion 136 is received within outer beam portion 140 in a sliding fit, so that the two beam portions are movable with respect to each other in the forward and rearward directions, along the longitudinal axis of beam 42. A pair of brackets 142 are attached by welding at a forward end of beam portion 140. At the forward ends of brackets 142 are pins 144 whose axes are perpendicular to the longitudinal axis of beam 42 and that respectively support a pair of rollers 146.

An elongated pin 137 is slideable vertically within a bushing 139 that is attached to plate 148. When extended downward by a handle end (not shown) on the opposite side of bushing 139, i.e. in the position shown in FIG. 4, pin 137 extends through a hole in a bracket 141 attached to cross member 34, thereby securing elongated beam or member 42, and therefore second sub-frame 90, against movement laterally with respect to the chassis frame, and thereby holding elongated beam 42 in position for travel, aligned with the trailer's longitudinal axis.

Figure 14:
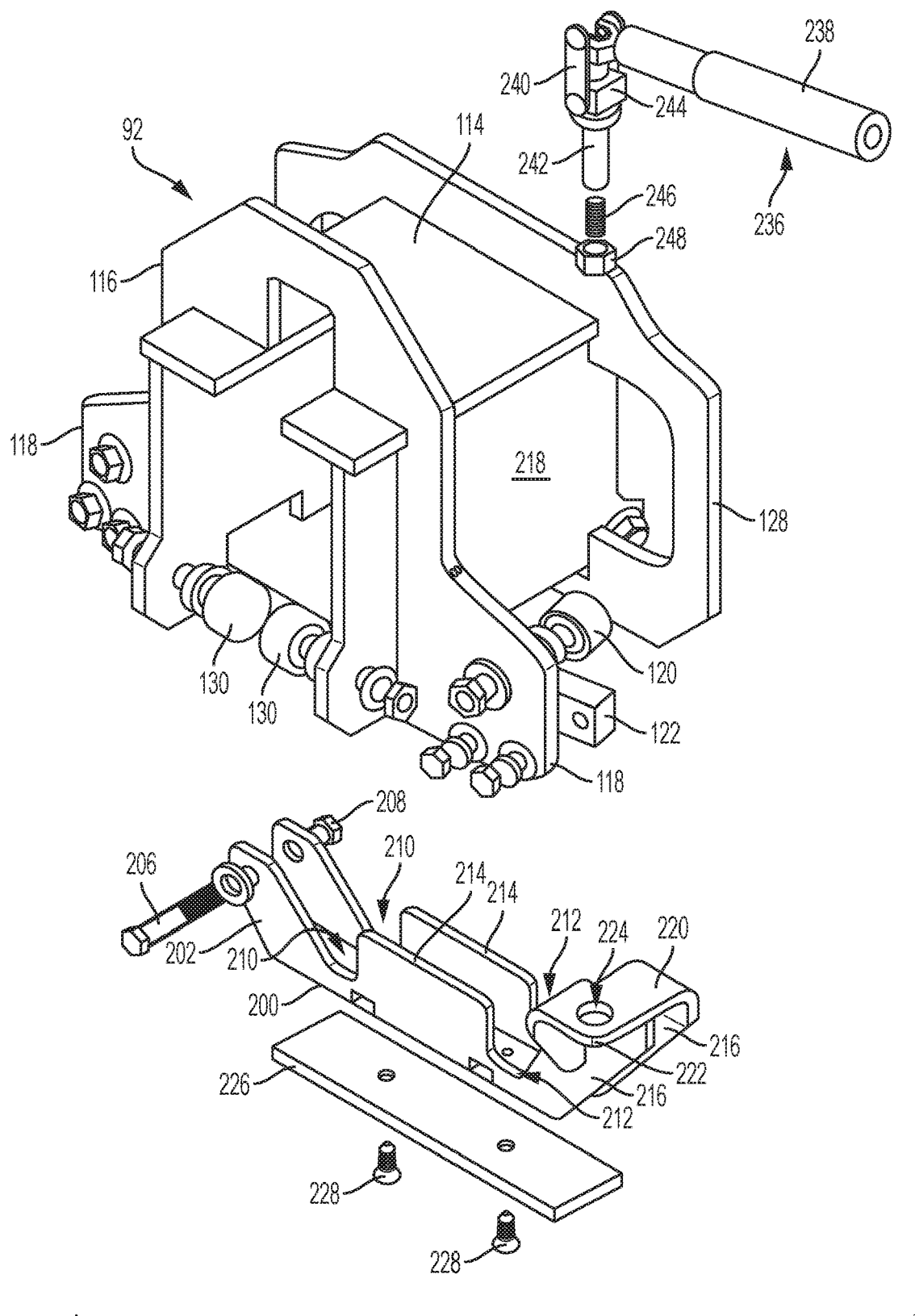
FIG. 14 is an exploded view of an embodiment of a collar with locking bracket for use with a wheeled vehicle and core saw system as in FIG. 1.

Referring to FIGS. 7 and 14, a locking bracket 200 extends underneath main body 114 of collar 92 between brackets 116 and 128. Bracket 200 includes a yoke-shaped end 202 comprised of a pair of flanges that extend on opposing sides of a flange 204 fixed to and extending from one side of C-shaped main body 114. A bolt extends through aligned holes in the flanges of yoke end 202 and flange 204, and a threaded end of bolt 206 is secured by a threaded nut 208. Bracket 200 is thereby pivotally attached to collar 92 by bolt 206 and is pivotable about the longitudinal axis of elongated bolt 206 with respect to collar 92. The vertical side of main body 114 of collar 92 to which flange 204 is attached is received within notches 210 formed in the vertical sides of bracket yoke end 202. Similarly, two notches 212 at the other side of bracket 200 receive the opposing vertical side wall 218 of main body 114. Two generally planar flanges, with the planes being aligned vertically, 214 are thereby defined between notches 210 and 212. Two end flanges 216 extend vertically upward from the bottom edge of side wall 218 to support a horizontal flange 220 that extends horizontally to one side of the main body of locking bracket 200 toward bracket 116 so that a distal end 222 of horizontal flange 220 is disposed directly above race 44. A through-hole 224 extends vertically through distal end 222, above race 44. A skid plate 226 is attached to an underside (which extends between the lower ends of flanges 214) of bracket 200 by screws 228. As described below, when bracket 200 is in an unlocked state, bracket 200 pivots slightly downward with respect to collar 92, about the longitudinal axis of bolt 206, so that a bottom of bracket 200 may rest on the upper surface of horizontal portion 36 of cross member 34 and may move across such upper surface as box beam element 42 (FIG. 2) moves laterally with respect to the chassis frame.

In the embodiment of FIG. 7, a T-shaped lock rod 230 has a vertical portion 232 with a threaded end 234 that threads through hole 224 (which, in this embodiment, has a corresponding thread) so that the position of the lower distal end of vertical portion 232 with respect to the upper surface of race 44 is defined by the number of turns of lock rod 230 about the longitudinal axis of elongated vertical portion 232 within the threaded hole 224. In normal operation, the user grips the horizontal upper portion of lock rod 230 and rotates the lock rod so that threaded portion 234 of vertical portion 232 moves upward through hole 224. The lower distal end of threaded portion 234 may remain in contact with the upper surface of race 44, but this upper movement of threaded portion 234 in hole 224 increases the distance between the lower distal end of threaded portion 234 and the bottom surface of bracket 200, thereby allowing bracket 200 to pivot slightly downward, away from collar 92, about the longitudinal axis of bolt 206. This causes the upper surfaces of flanges 214 to move away from the bottom of outer box beam 140 of box beam element 42 (FIG. 2).

As described in more detail below, when the hydraulic systems raise the core saw so that the weight of the core saw is borne by beam 42, beam 140/42 bends slightly downward, carrying collar 92 downward with the beam (e.g. by engagement of the beam with rollers 130) so that wheels 120 engage the upper surface of race 44. The disposition of lock bracket 200 to its unlocked state described above facilitates this relative movement between beam portion 140 and collar 92. When, however, and as described below, the core saw is disposed on a work surface through contraction of hydraulic piston 58 (FIG. 4), cage 109 (FIG. 4) can no longer move downward in response to the piston's contraction. Since the mast is fixed in position relative to the cage, the contraction force applied by piston 58 cannot further lower the mast and cage and, therefore, exerts an upward force to beam 42/140, and therefore collar 92, with respect to the chassis frame. This brings friction blocks 122 into contact with the underside of race 44, thereby frictionally holding the collar and the beam in the lateral directions with respect to the chassis frame. Since the engagement of friction blocks 122 with the race holds collar 92 in position vertically with respect to the chassis frame, the compression force of piston 58 moves beam 42/140 slightly upward within collar 92, away from rollers 130 and into frictional contact with the horizontal upper surface of collar 92, thereby inhibiting the forward and rearward movement of beam portion 140 with respect to collar 92 and the chassis frame. To reinforce these locking effects (e.g. in the event of contrary forces resulting from downward force applied to the core saw motor/bit assembly by piston 60), the user actuates locking bracket 200 to its locked state to thereby hold and/or bias beam portion 140 in and/or to its upwardly-biased position against the horizontal upper plate of main body 114 of collar 92. To actuate bracket 200 to its locked state from its unlocked state, the user rotates the horizontal upper portion of lock rod 230 so that threaded end 234 threads downward through hole 224. Since the distal end of threaded end 234 is in contact with the upper surface of race 44, the threaded engagement pulls the main body of bracket 200 upward, pivotally about the longitudinal axis of bolt 206, thereby causing the upper edges of vertical flanges 214 to engage the underneath surface of beam portion 140. Further rotation of lock rod 230 increases the upward force applied by flanges 214 to beam portion 140, the force being applied through the threaded engagement of threaded portion 234 and threaded hole 224/flange 220 and the engagement of the distal end of threaded portion 234 and the upper surface of race 44. That is, the lock rod and bracket 200 exert an expansion force between the chassis frame and the second sub-frame, with the degree of this force determining the degree to which bracket 200 biases beam 42/140 upward into collar 92. This upwardly-directed force against beam portion 140 maintains or increases the frictional lock between the beam portion and the horizontal upper portion of main body portion 114 of collar 92 and the frictional lock between friction blocks 122 and race 44.

When the operator is ready to raise the core saw, the operator releases lock bracket 200 by turning the horizontal upper portion of lock rod 230 in the opposite direction, thereby relieving the expansion force between the chassis frame and the second sub-frame. Bracket 200 then rotates downward about the axis of bolt 206 and away from collar 92, as described above.

In the embodiment of FIG. 14, lock rod 230 (FIG. 7) is replaced by a cam over device 236 including a lever 238 pivotally attached at one end thereof to two upwardly-extending opposing flanges 240 that form a yoke on opposing sides of a pin 242 that moves slidably through the center of a jam nut 244 that is inserted into and fixed with respect to through hole 224. A threaded pin 246 is received in a threaded interior hole in the bottom of pin 242 and threadedly adjusted with respect thereto to define a desired overall length of pins 242 and 246. A jam nut 248 slides over threaded pin 246 into contact with hollow pin 242 and is engaged to pin 242 to thereby fix pin 246 into the selected position with respect to pin 242. In operation, when lever 238 of cam over device 236 is in the position shown in FIG. 14, lever 238 does not block the upward movement of pin 242/246, or does so at a relatively higher position of pin 242/246 than where the handle is rotated 90° to a vertically-aligned position. Thus, pins 242/246 may slide relatively further upward with respect to jam nut 244 when lever 238 is in its horizontal position than when lever 238 is pivoted about the axis of the connection between lever 238 and flanges 240 so that the longitudinal axis of elongated lever 238 is vertical and aligned with the longitudinal axis of elongated pins 242/246. In the latter position, the end of lever 238 at flanges 240 is moved up and over the top of pin 242, thereby camming pin 242/246 downward through jam nut 244. Similar to the embodiment of FIG. 7, the distal end of pin 246 engages the upper surface of race 44. The length of combination pin 242/246 is selected so that, in the first position of lever 238 (i.e. the horizontal position shown in FIG. 14), pin 242/246 slides upward in jam nut 244, thereby allowing flange 220 to move downward toward race 44 and the main body of locking flange 200 to pivot downward and away from the main body of collar 92 about the longitudinal axis of bolt 206 and allowing flanges 214 to disengage and move away from the underside of beam portion 140. This, then, allows the engagement of collar wheels 120 with race 44, and relative lateral and longitudinal movement of beam 140 with respect to the chassis frame when the beam 42 (FIG. 2) fully supports the weight of the core saw, as discussed above. When the core saw is moved down so that the cage engages the work surface, and the contraction force of piston 58 (FIG. 4) exerts an upward force to beam portion 140 with respect to the chassis frame so that collar 92 moves upward, friction blocks 122 engage the underside of race 44, and the upper surface of beam portion 140 engages the underside of the upper horizontal portion of main portion 114 of collar 92, the operator grips handle 238 and pivots it upwardly about the pivot axis between the end of handle 238 and flanges 240 so that the end of handle 238 cams pin combination 242/246 downward against the upper surface of race 44. Since pin combination 242/246 moves downward with respect to jam nut 244, which is held in position with respect to the end of handle 238 by the connection of flanges 240 to both jam nut 244 and the end of handle 238, this pushes jam nut 244 upward with respect to race 44. Since jam nut 244 is fixed to flange 220 at hole 224, this moves the main portion of lock bracket 230 upward, pivotally about the longitudinal axis of bolt 206, so that the upper edges of flanges 214 engage the underside of beam portion 140 (FIG. 2). That is, cam over device 236 and bracket 200 exert an expansion force between the chassis frame and the second sub-frame, with the degree of this force determining the degree to which bracket 200 biases beam 42/140 upward into collar 92. This upwardly-directed force against beam portion 140 maintains or increases the frictional lock between the beam portion and the horizontal upper portion of main body portion 114 of collar 92 and the frictional lock between friction blocks 122 and race 44.

When the operator is ready to raise the core saw, the operator moves lock bracket 200 from the locked state to the unlocked state by moving handle 238 pivotally about its pivotal connection with flanges 240 from its vertical position to the horizontal position shown in FIG. 14, thereby allowing pin combination 242/246 to again move upward with respect to jam nut 244 so that jam nut 244 and flange 220 can move downward toward race 44 and bracket 200 can move away from the bottom of the beam and the collar, thereby relieving the expansion force between the chassis frame and the second sub-frame.

At the rearward end of outer beam portion 140 is welded or otherwise attached a rectangular, generally planar plate 148. A bracket 150 is welded both to beam portion 140 and plate 148. Referring also to FIGS. 4 and 12, one end of hydraulic cylinder 58 attaches to bracket 150 via a pin 152 that passes through a yoke end of hydraulic cylinder 58 and a hole 154 through bracket 150. The hydraulic cylinder's other end attaches by a similar pin/yoke/hole mechanism to a bracket 156 welded to an upper end of first sub-frame 86. Referring to FIGS. 1 and 12, and with references to FIGS. 2 and 4, first sub-frame 86 has a pair of elongated side beams 158 parallel to each other. A rear panel 162 extends between the two side beams 158 and closes the forward portion of first sub-frame 86. These structures together form an elongated vertically-oriented mast. A generally planar plate 160, which is attached to back plate 162, extends to the sides beyond each of side beams 158, so that the vertically-extending side edges of plate 160 are exposed as edge flanges of first sub-frame 86.

Figure 10:
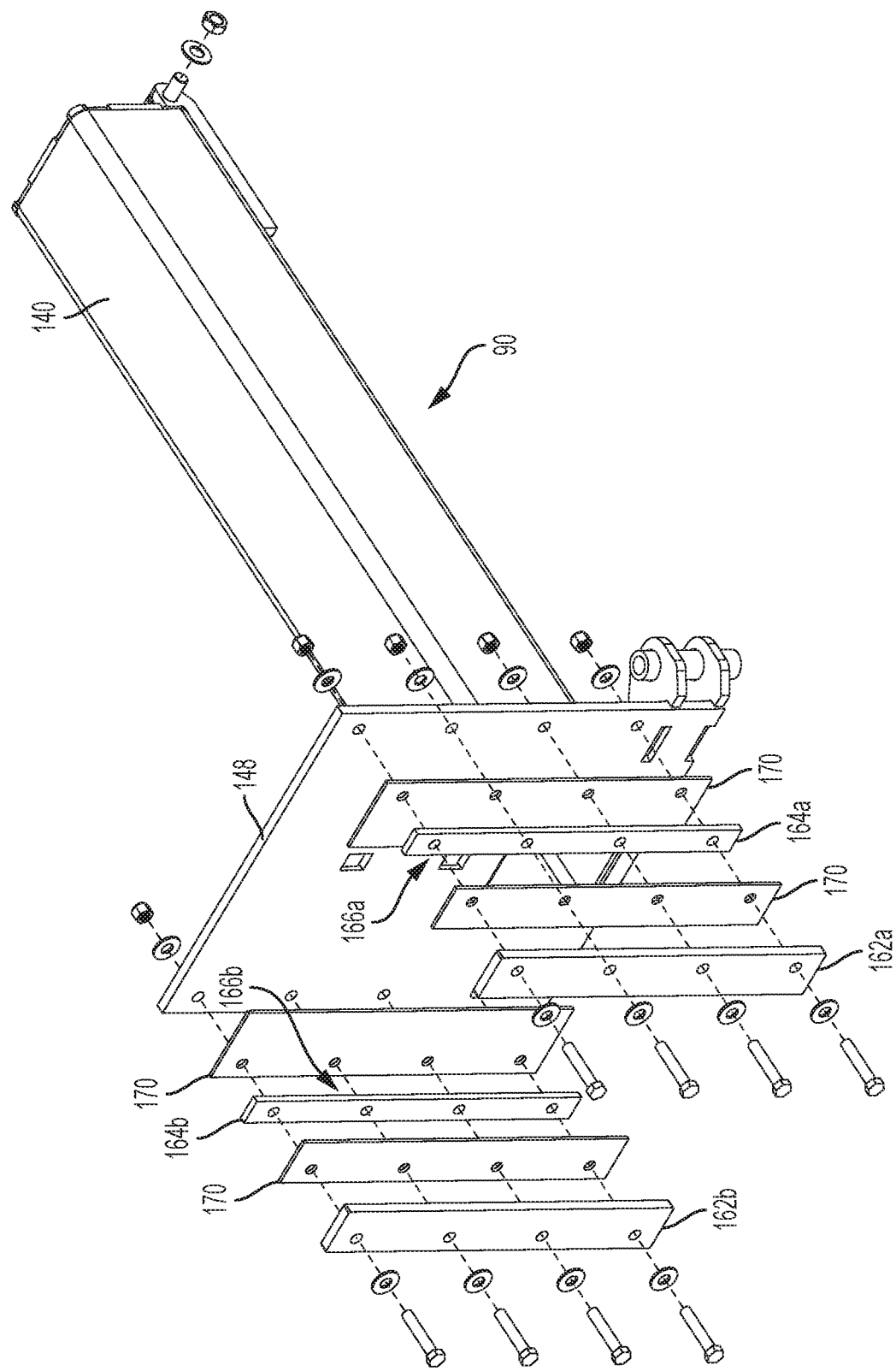
FIG. 10 is a partial exploded view of a sub-frame for use in the wheeled vehicle and core saw system of FIG. 1.

First sub-frame 86 attaches to second sub-frame 90 through the attachment of hydraulic cylinder 58 between brackets 150 and 156 and by the engagement of plate 148 to plate 160. Referring also to FIG. 10, a pair of elongated bars 162a and 162b are bolted on the rearward face of plate 148 via spacers 164a and 164b. Spacers 164a and 164b are not as wide as bars 162a and 162b, but the spacers are aligned with the outer edges of the bars, thus creating inward-facing gaps 166a and 166b between plate 148 and the inner edges of bars 162a and 162b. The vertical side edges 168 of plate 160 are received within gaps 166a and 166b, respectively, so that bars 162a/162b and plate 148 retain first sub-frame 86 with respect to second sub-frame 90 in forward and rearward directions 24/26 (generally, and in the directions defined by the longitudinal axis of elongated member 42, specifically) but allow plates 160 and 148, and therefore the first sub-frame and the second sub-frame, to move vertically with respect to each other. Solid lubricant sheets 170 are disposed between the bars and the spacers, and between the spacers and plate 148, to reduce friction between plate 160, on one hand, and the bars and plate 148, on the other, as the two sub-frames move vertically with respect to each other. Accordingly, actuation of hydraulic cylinder 58 to expand causes the mast/first sub-frame 86 to move upward with respect to second sub-frame 90 and trailer chassis frame 12, whereas retraction of hydraulic cylinder 58 lowers first sub-frame 86 with respect to the second sub-frame and the chassis frame.

A pair of bushings 111 (FIGS. 11 and 12) attached to cage 109 fix the cage with respect to the first sub-frame/mast via pins that attach bushings 111 to brackets 113 that are attached to the mast. As described below, the core saw motor and bit are attached to the mast via hydraulic piston 60. Thus, both the core saw cage and motor/bit assembly are carried by first sub-frame 86. Assuming piston 60 is in a fixed upward position so that the core saw motor and bit are in an upward position with respect to the cage, movement of the first sub-frame to an upward position by hydraulic cylinder 58 moves the core saw upward, above a ground, road, floor, or other surface upon which the trailer moves, with sufficient clearance that the core saw should not interfere with structures on that surface. In certain embodiments, the two sub-frames are configured with respect to each other so that manipulation of cylinders 58 and 60 can position the cage, motor, and bit of core saw 88 to maintain all three components at least as high as side beams 14 of the chassis frame. Retraction of hydraulic cylinder 58 moves core saw 88 toward the ground or other work surface.

Figure 9:
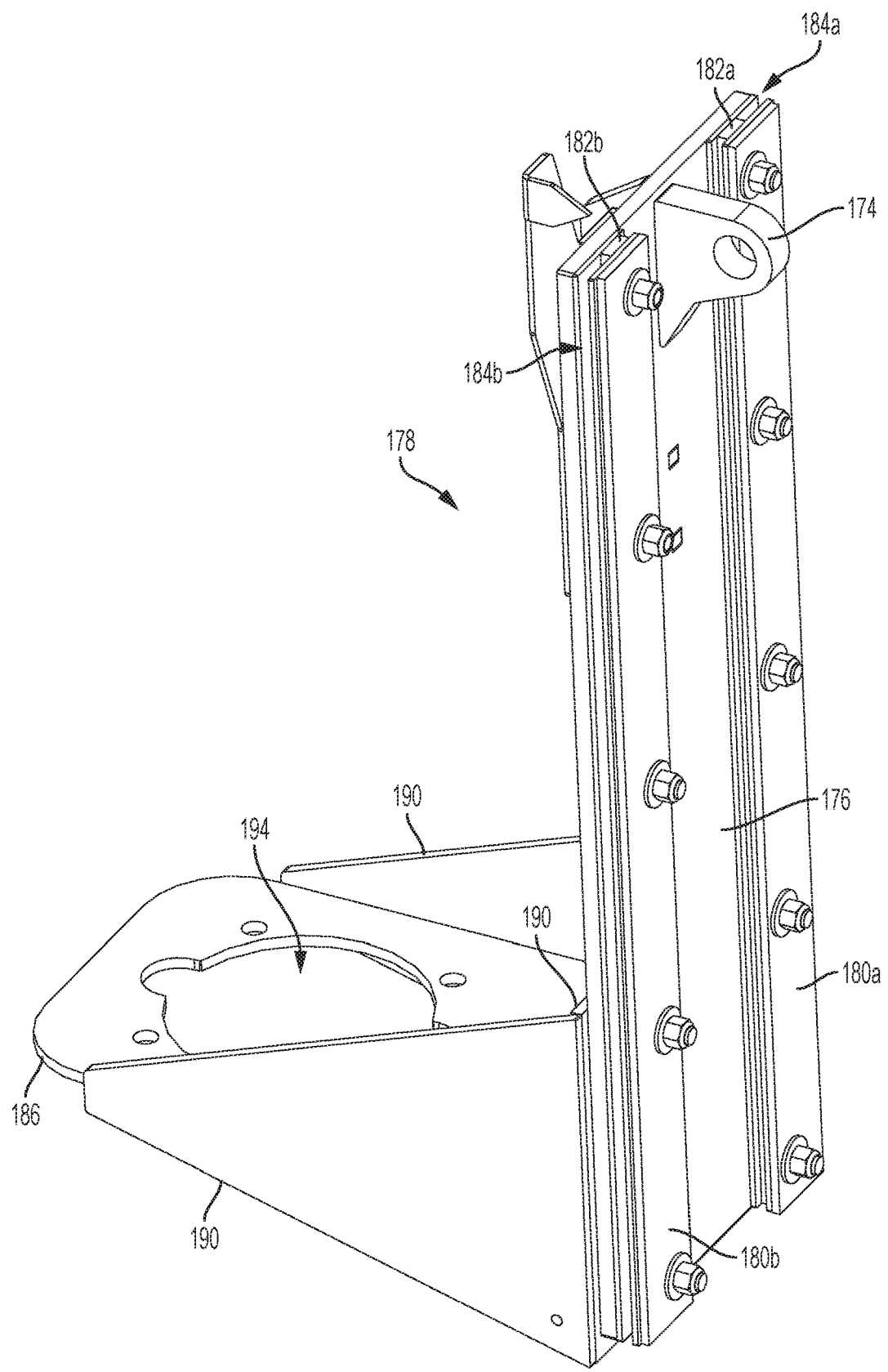
FIG. 9 is a partial perspective view of a sub-frame for use in the wheeled vehicle and core saw system of FIG. 1.

Referring to FIGS. 4 and 9, hydraulic cylinder 60 controls movement of the core saw motor and bit with respect to sub-frame/mast 86 and cage 109. A pin 172 passes through a yoke on a bottom end of cylinder 60 and also passes through flanges that are welded or otherwise connected to first sub-frame 86 so that the hydraulic cylinder's lower end is fixed to the mast. The upper end of hydraulic cylinder 60 is attached by a pin/yoke/hole arrangement to an extension 174 welded to a main plate 176 of a bracket 178. A pair of elongated bars 180a and 180b are bolted onto the rearward side of main plate 176 and are spaced apart from main plate 176 by respective elongated spacers 182a 182b and lubricant sheets, in a manner similar to the arrangement of plate 148 and bars 162a/162b, discussed above with respect to FIG. 10. In this instance, the plate, bars and spacers form vertically elongated groves 184a and 184b that are parallel to each other and that are open in the outward-facing side directions. Groves 184a and 184b receive vertically-extending edges (not shown) of side beams 158 (FIG. 12) of first sub-frame 86 that extend inwardly from the rearwardmost extent of beams 158. This interaction between side beams 158 and bracket 178 retains bracket 178 in the forward and rearward directions with respect to the first sub-frame but allows relative vertical movement between bracket 178 and first sub-frame 86. Accordingly, when cylinder 60 is in its most extended position, as shown in FIG. 4, bracket 178, and therefore the core saw motor 63/bit 110 assembly, is at its uppermost position relative to first sub-frame 86. Conversely, retraction of cylinder 60 moves bracket 178 and core saw 88 downward with respect to the first sub-frame.

Bracket 178 includes a horizontal lower flange 186 that is welded to bracket members 190 that are bolted to main bracket plate 176. When piston 60 moves the motor/bit assembly to its uppermost position with respect to the mast, horizontal lower flange 186 extends above a surface 188 (FIG. 12) of cage 109 that surrounds the core saw spindle 192 (FIG. 11) and saw blade 110 (FIG. 4). As indicated in FIGS. 9 and 12, a hole 194 through horizontal flange 186 is aligned with a through-hole 196 through top surface 188. Hydraulic motor 62 rotatably drives spindle 192, which extends through hole 194, and to which can be attached core saw blade 110 (FIG. 4) so that the core saw blade can engage and cut concrete, earth or other material at a work surface. Retraction of hydraulic piston 60 moves the motor/bit assembly downward through hole 196 and with respect to cage 109.

Through operation of controls at a control interface provided by control panel 112 (FIG. 13), an operator actuates a series of fluid valves 198 within control panel 112 (visible in the partial view of FIG. 4) within the hydraulic fluid lines between hydraulic pump 54/reservoir 56 and hydraulic cylinders 58 and 60 and hydraulic motor 62. Electrical controls at control panel 112 that are operable by the user and that are in electrical communication with the starter motor of gasoline engine 50 and battery 68 allow the user to start gasoline engine 50, thereby actuating hydraulic pump 54 to provide hydraulic fluid pressure in the fluid lines. By actuation of the hydraulic controls, the operator may selectively apply pressurized hydraulic fluid to either of the hydraulic cylinders, together or independently of each other, to thereby raise and lower the core saw and move the motor/bit assembly relative to the mast and the cage, and to the core saw motor to rotationally drive the core saw spindle and cutting blade. More specifically, and assuming the motor/bit assembly are in their upward position with respect to the cage, as shown in FIG. 4, through selective control of hydraulic cylinder 58 via the controls of control panel 112 to retract, the hydraulic cylinder lowers first sub-frame 86 and the core saw an initial distance toward the work surface, until the bottom of cage 109 engages the work surface. The operator, again through operation of the hydraulic controls at control panel 112, then controls hydraulic cylinder 60 to retract, thereby moving the motor/bit assembly downward with respect to the cage until the bit comes into contact with the ground or other surface to be worked. Further control of the hydraulic system by the operator through control panel 112 causes hydraulic motor 62 to rotate spindle 192 and saw blade 110, while piston 60 continues to apply downward pressure, so that the blade cuts into the work surface. When the core has been cut to a desired depth, the operator vertically retracts spindle 192 and saw blade 110 (by expanding piston 60) via the hydraulic controls and controls hydraulic piston 58 to its expanded position to raise the core saw above the work surface, thereby allowing further movement of trailer 10.

As discussed above, and referring to FIGS. 4 and 8, outer beam portion 140 is movable with respect to inner beam portion 136 of second sub-frame 90 so that outer beam portion 140 is movable with respect to the chassis frame substantially in forward and rearward directions 24/26, thereby also moving the first sub-frame and the core saw in those directions. Beam 42 is also movable with collar 92 along the arc of race 44 (FIG. 2) as inner beam portion 136 pivots about its connection with bracket 78 (FIG. 2), thereby also allowing movement of the first sub-frame and the core saw in the side-to-side directions with respect to the trailer's longitudinal axis. Because of the ability to move side-to-side over the limited degree permitted by the travel of collar 92 along race 44, it is possible for movement in the forward and rearward directions, due to the expansion and contraction of beam portions 136 and 140 with respect to each other, to be made at an acute angle with respect to the trailer's actual longitudinal axis. Regardless of that deviation, such movement is nonetheless substantially in forward and reward directions 24/26. Similarly, the side-to-side movement of sub-frames 86 and 92, and core saw 88, includes a degree of front-to-back movement, due to the pivotal connection of beam 42 to the chassis frame at bracket 78. Such movement is nonetheless generally in the side-to-side directions and is considered substantially side-to-side.

When the operator drives hydraulic cylinders 58 and 60 to their extended positions, so that first sub-frame 86 and core saw 88 are in their upper positions for travel, the operator may manually push core saw 88 in the forward direction toward the trailer, thereby moving beam portion 140 forward over beam portion 136 (FIG. 8) and moving core saw 88 and first sub-frame 86 forward into an area 202 (FIG. 2) between the rearward ends of side rails 14 of chassis frame 12. The operator may then deploy pin 137 (FIG. 4) to its downward position, through the hole in bracket 141, thereby securing the core saw in place for transport by trailer 10.

When the operator manually pushes core saw 88 forward, outer beam portion 140 slides through body 114 of collar 92, which is fixed in the front-to-back position by the interaction of race 44 (FIG. 2) and notches 126 (FIG. 8). Rollers or wheels 146, which engage and roll upon the lower surface of beam portion 136, facilitate the movement of outer beam portion 140 relative to inner beam portion 136. Thus, movement of the core saw forwardly and rearwardly through the telescoping action of beam 42 maybe effected manually, though it should be understood that a third hydraulic cylinder maybe attached at its opposite ends to beam portion 136 and beam portion 140 to thereby allow automatic deployment of beam 42 in those directions.

When core saw 88 and sub-frame 86 are in their upwardmost position, as shown in FIG. 4, the weight of the core saw and the first sub-frame is borne by beam portion 140 via its attachment with those components via plate 148 and the two hydraulic cylinders. This weight causes beam portion 140 to flex downward, which in turn pushes body 114 of collar 92 downward. Due to the attachment of wheels 120 to bracket body 114, this brings wheels 120 downward into contact with race 44. Due to the slight cant of flanges 118 as described above, wheels 120 are aligned on the top surface of race 44 to thereby facilitate rolling of the wheels and, therefore, movement of collar 92 along the surface of race 44.

As described above, there is a slight vertical clearance within body 114 that allows a correspondingly slight vertical movement of beam portion 140 within body 114. When the core saw and first sub-frame weight are applied entirely to beam portion 140, the beam portion flexes slightly downward. Since wheels 120 then rest on race 44, which is fixed in its vertical position on the chassis frame, collar 92 does not move further downward with the downward-flexing beam portion. This, in turn, brings the bottom surface of beam portion 140 downward into contact with wheels or rollers 130 at the bottom corners of collar body 114. Wheels 130 thereby facilitate the telescoping movement of beam portion 140 in the forward and rearward directions with respect to collar 92 and the chassis frame. The wheels thereby also allow the operator to manually move the core saw forward and back toward and away from the trailer, even when the second sub-frame is bearing the full weight of the core saw and the first sub-frame. Under these conditions, the operator may also manually move the core saw and the first sub-frame from side-to-side. Thus, the operator may push the first sub-frame and the core saw manually into area 202 between the chassis frame rails to secure the core saw for movement with the trailer. The user may also pull the core saw and first sub-frame rearward, away from the chassis frame from area 202 outward over a work area, and manually move the core saw and first sub-frame from side-to-side, as illustrated in comparison of FIGS. 1 and 2, in order to locate the core saw above a desired work surface location.

When, as described above, the operator controls the hydraulic system to move the core saw downward, so that cage 109 engages the work surface, the weight of the core saw and the first sub-frame is then borne by that surface. This relieves the downward pull on beam portion 140, allowing the beam portion to flex upward back to its normal orientation, due to its inherent upward bias when in a downward flexed condition. Moreover, the contraction force of piston 58 between the mast, which is now secured against the work surface, tends to pull beam 42 upward. Thus, beam portion 140 moves upward within collar 92 and moves the collar upward so that rollers 120 disengage race 44 and beam portion 140 disengages rollers 130. Simultaneously, friction blocks 122 engage the underside of race 44. The engagement of friction blocks 122 with race 44, under the pressure applied by the contraction of piston 58 and possibly by the now upwardly-flexing beam portion 140, creates a frictional engagement between blocks 122 and the race, and therefore between sub-frame 90 and the chassis frame, that inhibits side-to-side movement of collar 92 and beam 42, and therefore core saw 88, with respect to race and the trailer chassis frame. At the same time, a frictional engagement between an upper surface of beam portion 140 and the inner upper surface of collar 92 inhibits the front-to-back movement of beam portion 140 with respect to the chassis frame, and therefore the front-to-back movement of the core saw 88. Further, and as described above with respect to FIGS. 7 and 14, the operator may actuate a locking device from its unlocked state to its locked state to apply a further expansion force between the chassis frame and second sub-frame to thereby push beam portion 140 up against the horizontal upper portion of the collar, thereby maintaining or enhancing the frictional engagement between the top of the beam and the collar and between the friction blocks and the race. These frictional engagements thereby inhibit front-to-back and side-to-side movement of the core saw when it is in use at a work surface.

Accordingly, collar 92 forms a bearing between second sub-frame 90 and chassis frame 12 in two directions, i.e. front-to-back and side-to-side. The collar is a bearing in that it bears a force between sub-frame 90 and the chassis frame in the vertical direction but allows a greater degree of movement laterally between these two components of trailer 10 than would be present if the two components were to bear directly upon each other. While wheels/rollers are used in the presently-described embodiments to facilitate this movement, it should be understood that solid lubricants or other mechanisms may be used.

While one or more embodiments of the present invention have been described above, it should be understood that any and all equivalent realizations of the present invention are included within the scope and spirit of the present disclosure and the appended claims. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal and equivalent scope of the appended claims.

What is claimed is:

1. A wheeled vehicle and core saw system, comprising:
   a chassis having a frame and a plurality of wheels attached to the chassis frame so that the chassis frame is movable on the wheels in forward and rearward directions;
   a first sub-frame;
   a core saw attached to the first sub-frame, the core saw having a motor with an output shaft and a core bit attached to the output shaft;
   a second sub-frame attached to the chassis frame and attached to the first sub-frame so that the first sub-frame is movable vertically with respect to the second sub-frame, wherein at least part of the second sub-frame, to which the first sub-frame is attached, is movable with respect to the chassis frame substantially in the forward and rearward directions and substantially in side directions transverse to the forward and rearward directions;
   an actuator operably attached between the first sub-frame and the second sub-frame so that actuation of the actuator moves the first sub-frame vertically with respect to the second sub-frame; and
   a selectively engageable bearing disposed at a position between the second sub-frame and the chassis frame at which,
      at a first vertical position of the first sub-frame with respect to the second sub-frame, the second sub-frame supports a portion of the weight of the core saw that biases the second sub-frame into engagement with the chassis frame through the bearing, and
      at a second vertical position of the first sub-frame with respect to the second sub-frame, at which a surface independent of the second sub-frame bears at least part of the weight of the core saw, the second sub-frame disengages from the chassis frame via the bearing,
   wherein the bearing facilitates movement between the second sub-frame and the chassis frame in at least one of
      substantially the forward and rearward directions, and
      substantially the side directions.

2. The system as in claim 1, wherein the bearing facilitates movement between the second sub-frame and the chassis frame in both of
   substantially in the forward and rearward directions, and
   substantially in the side directions.

3. The system as in claim 1, wherein the bearing includes at least one roller that moves with one of the second sub-frame and the chassis frame between the first and second vertical positions of the first sub-frame with respect to the second sub-frame and a bearing surface that moves with the other of the second sub-frame and the chassis frame between the first and second vertical positions of the first sub-frame with respect to the second sub-frame.

4. The system as in claim 3, wherein the at least one roller includes at least one first roller oriented so that, when the second sub-frame engages the chassis frame through the bearing, the at least one first roller facilitates movement between the second sub-frame and the chassis frame in substantially the forward and rearward directions.

5. The system as in claim 3, wherein the at least one roller includes at least one second roller oriented so that, when the second sub-frame engages the chassis frame through the bearing, the at least one second roller facilitates movement between the second sub-frame and the chassis frame in substantially the side directions.

6. The system as in claim 1, wherein the actuator comprises a hydraulic cylinder.

7. The system as in claim 1, comprising a selectively engageable lock having a first surface attached to the second sub-frame and a second surface attached to the chassis frame,
   wherein the first surface and the second surface are disposed with respect to each other so that when the first surface and the second surface are engaged, the lock inhibits relative movement between the second sub-frame and the chassis frame in at least one of
      substantially the forward and the rearward directions, and
      substantially the side directions, and
   wherein the lock is disposed at a position between the second sub-frame and the chassis frame at which,
      at the first vertical position of the first sub-frame with respect to the second sub-frame, the first surface and the second surface are not engaged, and
      at the second vertical position of the first sub-frame with respect to the second sub-frame, the first surface and the second surface are engaged.

8. The system as in claim 1, wherein the second sub-frame comprises at least one elongated member.

9. The system as in claim 8, comprising a collar disposed on the elongated member so that the collar moves with the elongated member in the substantially side directions and so that the at least one elongated member is movable with respect to the collar in the substantially forward and rearward directions.

10. The system as in claim 9, wherein the bearing comprises at least one roller.

11. The system as in claim 10, wherein the bearing comprises a race, wherein the at least one roller is attached to the collar and the race is attached to the chassis frame, and wherein the at least one roller and the race are disposed with respect to each other so that
 at the first vertical position of the first sub-frame with respect to the second sub-frame, the at least one roller engages the race, and
 at the second vertical position of the first sub-frame with respect to the second sub-frame, the at least one roller and the race are not engaged.

12. The system as in claim 11, wherein the at least one roller is disposed on the collar so that, at the first vertical position of the first sub-frame with respect to the second sub-frame, the at least one roller is rollable on the race in the substantially side directions.

13. The system as in claim 10, wherein the collar is disposed on the elongated member so that the collar and the elongated member are movable vertically with respect to each other over a limited distance, wherein the collar is supported on the chassis frame so that the collar is movable vertically with respect to the chassis frame over a limited distance, and wherein the at least one roller is attached to the collar with respect to the elongated member so that
 at the first vertical position of the first sub-frame with respect to the second sub-frame, the elongated member is in a vertical position with respect to the collar so that the elongated member engages the at least one roller, and
 at the second vertical position of the first sub-frame with respect to the second sub-frame, the elongated member is in a vertical position with respect to the collar so that the elongated member and the at least one roller are disengaged.

14. The system as in claim 13, wherein the at least one roller is disposed on the collar so that, at the first vertical position of the first sub-frame with respect to the second sub-frame, the at least one roller is rollable on the elongated member in the substantially forward and rearward directions.

15. The system as in claim 11, comprising a selectively engageable lock having a first surface attached to the second sub-frame and a second surface attached to the chassis frame,
 wherein the first surface and the second surface are disposed with respect to each other so that when the first surface and the second surface are engaged, the lock inhibits relative movement between the second sub-frame and the chassis frame in at least one of
  substantially the forward and the rearward directions, and
  substantially the side directions, and
 wherein the lock is disposed at a position between the second sub-frame and the chassis frame at which,
  at the first vertical position of the first sub-frame with respect to the second sub-frame, the first surface and the second surface are not engaged, and
  at the second vertical position of the first sub-frame with respect to the second sub-frame, the first surface and the second surface are engaged.

16. The system as in claim 15, wherein the first surface is a surface of the collar and the second surface is a surface of the race, and wherein when the first surface and the second surface are engaged at the first vertical position of the first sub-frame with respect to the second sub-frame, friction inhibits relative movement between the first surface and the second surface.

17. The system as in claim 16, comprising a second actuator disposed between the second sub-frame and the chassis frame, wherein the second actuator is hand actuatable between a first position in which the second actuator applies a force between the second sub-frame and the chassis frame that biases the second sub-frame and the collar away from the chassis frame and biases the first surface and the second surface into engagement and a second position in which the second actuator does not apply the force.

18. The system as in claim 17, wherein the second actuator comprises a bracket pivotally attached to the collar and an elongated member in abutting engagement with the chassis frame and in relatively movable engagement with the bracket.

19. The system as in claim 18, wherein the elongated member is a threaded rod that threads through the bracket and engages the chassis frame.

20. The system as in claim 19, wherein the elongated member is an elongated shaft that is slidably engaged with the bracket and engaged with the chassis frame, and wherein the actuator comprises a cam over device engaged with the elongated shaft and the bracket so that in a first position of the cam over device, the cam over device applies the force to the bracket and the elongated shaft and in a second position of the cam over device the cam over device does not apply the force to the bracket and the elongated shaft.

21. A wheeled vehicle and core saw system, comprising:
 a chassis having a frame and a plurality of wheels attached to the chassis frame so that the chassis frame is movable on the wheels in forward and rearward directions;
 a first sub-frame;
 a core saw attached to the first sub-frame, the core saw having a motor with an output shaft and a core bit attached to the output shaft;
 a second sub-frame attached to the chassis frame and attached to the first sub-frame so that the first sub-frame is movable vertically with respect to the second sub-frame, wherein at least part of the second sub-frame, to which the first sub-frame is attached, is movable with respect to the chassis frame substantially in the forward and rearward directions and substantially in side directions transverse to the forward and rearward directions;
 an actuator operably attached between the first sub-frame and the second sub-frame so that actuation of the actuator moves the first sub-frame vertically with respect to the second sub-frame; and
 a selectively engageable lock having a first surface attached to the second sub-frame and a second surface attached to the chassis frame,
 wherein the first surface and the second surface are disposed with respect to each other so that when the first surface and the second surface are engaged, the lock inhibits relative movement between the second sub-frame and the chassis frame in at least one of
  substantially the forward and rearward directions, and
  substantially the side directions, and
 wherein the lock is disposed at a position between the second sub-frame and the chassis frame at which
  at a first vertical position of the first sub-frame with respect to the second sub-frame, the second sub-frame supports a portion of the weight of the core saw that separates the first surface and the second surface, and
  at a second vertical position of the first sub-frame with respect to the second sub-frame, at which a surface independent of the second sub-frame bears at least part of the weight of the core saw, the first surface and the second surface are engaged.

22. The system as in claim 21, wherein the second sub-frame comprises at least one elongated member.

23. The system as in claim 22, comprising a collar disposed on the elongated member so that the collar moves with the elongated member in the substantially side directions and so that the at least one elongated member is movable with respect to the collar in the substantially forward and rearward directions.

24. The system as in claim 23, wherein the first surface is a surface of the collar and the second surface is a surface of the chassis frame, and wherein when the first surface and the second surface are engaged at the first vertical position of the first sub-frame with respect to the second sub-frame, friction inhibits relative movement between the first surface and the second surface.

* * * * *